United States Patent
Saulnier et al.

(10) Patent No.: US 9,556,727 B2
(45) Date of Patent: Jan. 31, 2017

(54) METHOD AND APPARATUS FOR ACOUSTIC DOWNHOLE TELEMETRY AND POWER DELIVERY SYSTEM USING TRANSVERSE OR TORSIONAL WAVES

(71) Applicant: RENSSELAER POLYTECHNIC INSTITUTE, Troy, NY (US)

(72) Inventors: Gary J. Saulnier, East Greenbush, NY (US); Kyle R. Wilt, Sand Lake, NY (US); R. Benjamin Litman, Huntington, NY (US); Henry A. Scarton, Troy, NY (US); Soumya Chakraborty, Troy, NY (US)

(73) Assignee: RENSSELAER POLYTECHNIC INSTITUTE, Troy, NY (US)

(*) Notice: Subject to any disclaimer, the term of this patent is extended or adjusted under 35 U.S.C. 154(b) by 0 days.

(21) Appl. No.: 15/030,690

(22) PCT Filed: Mar. 24, 2015

(86) PCT No.: PCT/US2015/022206
§ 371 (c)(1),
(2) Date: Apr. 20, 2016

(87) PCT Pub. No.: WO2015/148477
PCT Pub. Date: Oct. 1, 2015

(65) Prior Publication Data
US 2016/0265349 A1 Sep. 15, 2016

Related U.S. Application Data

(60) Provisional application No. 61/969,977, filed on Mar. 25, 2014.

(51) Int. Cl.
*E21B 47/16* (2006.01)
*H04L 25/02* (2006.01)
(Continued)

(52) U.S. Cl.
CPC .......... *E21B 47/16* (2013.01); *H04B 1/69* (2013.01); *H04B 11/00* (2013.01);
(Continued)

(58) Field of Classification Search
CPC .......... E21B 47/16; H04B 11/00; H04B 1/69; H04B 2001/6912; H04L 27/148; H04L 27/103; H04L 25/0288; H04L 25/0202; H04L 25/4902
(Continued)

(56) References Cited

U.S. PATENT DOCUMENTS 3,205,477 A 9/1965 Kalbfell
7,654,148 B2 2/2010 Tomlinson, Jr.
(Continued)

FOREIGN PATENT DOCUMENTS

WO 2014035785 A1 3/2014
WO WO 2014035785 A1 * 3/2014 ......... E21B 41/0085

OTHER PUBLICATIONS

Lawry, Tristan J. et al., "A High-Performance Ultrasonic System for the Simultaneous Transmission of Data and Power Through Solid Metal Barriers", IEEE Transactions on Ultrasonics, Ferroelectrics, and Frequency Control, vol. 60, No. 1, Jan. 2013, pp. 194-203.
(Continued)

*Primary Examiner* — Tanmay Shah
(74) *Attorney, Agent, or Firm* — Notaro, Michalos & Zaccaria P.C.

(57) ABSTRACT

Methods and apparatus for transmitting power and data along a metal pipe using wideband acoustic waves. Arrangements use shear-horizontal waves, transmitting narrowband signals for power applications and wideband signals for communications having a bandwidth greater than the coherence bandwidth of the acoustic-electric channel. Chirp wave signals, direct sequence spread signals, and on-off keying
(Continued)

are used. Acoustic-electric channels include wedges fixed to a pipe or other substrate, transducers fixed to the wedges, and electronics linked to each transducer for sending and receiving power and signals. Matching networks, rectification circuits, and non-coherent signal reception methods may be used.

21 Claims, 15 Drawing Sheets

(51) Int. Cl.
*H04L 25/49* (2006.01)
*H04B 1/69* (2011.01)
*H04B 11/00* (2006.01)
*H04L 27/10* (2006.01)
*H04L 27/148* (2006.01)

(52) U.S. Cl.
CPC ...... *H04L 25/0202* (2013.01); *H04L 25/0288* (2013.01); *H04L 25/4902* (2013.01); *H04L 27/103* (2013.01); *H04L 27/148* (2013.01); *H04B 2001/6912* (2013.01)

(58) Field of Classification Search
USPC .......................................................... 367/82
See application file for complete search history.

(56) References Cited

U.S. PATENT DOCUMENTS

| | | | |
|---|---|---|---|
| 2003/0151977 | A1 | 8/2003 | Shah et al. |
| 2004/0223553 | A1* | 11/2004 | Kumar .................. H04L 1/0059 375/259 |
| 2005/0205248 | A1 | 9/2005 | Barolak et al. |
| 2007/0167133 | A1 | 7/2007 | Tomlinson, Jr. et al. |
| 2007/0209865 | A1* | 9/2007 | Kokosalakis .......... H04B 13/00 181/0.5 |
| 2011/0196236 | A1* | 8/2011 | Swamy ................ A61B 8/5223 600/443 |

OTHER PUBLICATIONS

Lawry, Tristan J. et al., "A high-temperature acoustic-electric system for power delivery and data communication through thick metallic barriers", Proc. of SPIE vol. 8035 80351D-2, http://proceedings.spiedigitallibrary.org/ on Mar. 11, 2015.

Bielinski, Magdalena, et al., "Application of Adaptive OFDM Bit Loading for High Data Rate Through-Metal Communication", IEEE Communications Society, IEEE Globecom 2011, Philadelphia, PA 19104.

Bielinski, Magdalena, et al., "Bit-Loaded PAPR Reduction for High-Data-Rate Through-Metal Control Network Applications", IEEE Transactions on Industrial Electronics, vol. 61, No. 5, May 2014.

Al-Nuaimi, et al., "Coherence bandwidth characterisation and estimation for indoor Rician multipath wireless channels using measurements at 62.4 GHz", IEE Proc.-Microw. Antennas Propaq., vol. 149. No. 3, Jun. 2002, pp. 181-187.

Dubouloz, S., et al., "Energy Characteristics of UWB Channel Models Applied to System Design", CEA / LETI—Laboratory of Electronics and Information Technology, 2005 IEEE, Cedex 9, France.

Chakraborty, Soumya, et al., "Estimating Channel Capacity and Power Transfer Efficiency of a Multi-Layer Acoustic-Electric Channel", Proc. of SPIE vol. 8753 87530F-1, http://proceedings.spiedigitallibrary.org/ on Mar. 11, 2015 Terms of Use: http://spiedl.org/terms.

Li, Yinghui, et al., "Experimental Study on Ultrasonic Signal Transmission Within the Water-filled Pipes", Department of Electronic Engineering City University of Hong Kong, 1997 IEEE, pp. 93-98.

Primerano, Richard, et al., "High Bit Rate Ultrasonic Communication through Metal Channels", Engineering Department Drexel University, 2009 IEEE.

Bacher, Christoph, et al., "Low Cost Data Transmission Via Metallic Solids for Sensor Networking", IEEE—2005 International Conference on Emerging Technologies, 2005 IEEE, pp. 193-198.

Lawry, T.J., et al., "Penetration-Free System for Transmission of Data and Power Through Solid Metal Barriers", The 2011 Military Communications Conference—Track 1—Waveforms and Signal Processing, 2011 IEEE, pp. 389-395.

Abbashi-Moghadam, Dariush, et al., "Performance Analysis of Time Reversal UWB Communication with Non-coherent Energy Detector", Wireless Pers Commun (2014) 77:2291-2303, pp. 2292-2303.

Dutta, Ramen, et al., "Performance of Chirped-FSK and Chirped-PSK in the Presence of Partial-band Interference", University of Twente, Enschede, The Netherlands, 2011 IEEE, pp. 1-6.

Saulnier, Gary, J., et al., "Through-Wall Communication of Low-Rate Digital Data Using Ultrasound", 2006 IEEE Ultrasonics Symposium. 2006 IEEE, pp. 1385-1389.

International Search Report and Written Opinion issued in corresponding PCT/US2015/022206, dated Jul. 2, 2015.

\* cited by examiner

METHOD AND APPARATUS FOR ACOUSTIC DOWNHOLE TELEMETRY AND POWER DELIVERY SYSTEM USING TRANSVERSE OR TORSIONAL WAVES

RELATED APPLICATION

Benefit and priority are claimed to U.S. Provisional Application No. 61/969,977, filed Mar. 25, 2014, which is fully incorporated by reference herein.

BACKGROUND

The present invention relates generally to the field of acoustic communication and to pipes for gas and oil production, and in particular to transducer arrangements for communicating power and data through metal substrates such as along pipes.

There is growing interest in expanding the capability to measure environmental parameters such as pressure and temperature at any location within the downhole environment present in hydrocarbon wells. These wells often utilize connected steel casing segments to form isolated well sections. Multiple concentric casings of different diameters separated by annular regions may be present in some segments of the well. These casings are used to isolate some regions of the well from other sections such as, for instance, hold back the high hydrostatic pressures present at large depths. Regions may also be separated within a particular string of casing segments using, for instance, a packer which essentially acts as a plug within the casing. Here the packer may separate a high-pressure section of the string from a lower-pressure section.

It is sometimes desirable to place measurement devices to measure environmental parameters such as, for example, temperature and pressure below a packer. The ability to power and communicate with these devices is limited, however, by the need to avoid having any type of electrical or mechanical feed-through such as wires or hydraulic lines pass through the packer, since such a feed-through presents a possible location of weakness that could result in loss of environmental isolation and/or failure. As a result, there is a need for methods to convey power and data from one side of a packer to the other without using physical penetrations of any sort.

Acoustic-electric channels have emerged as a wireless alternative for transmitting data and power through metallic barriers that otherwise block the passage of electromagnetic waves. Most work to date has dealt with the use of a reverberant acoustic-electric channel formed through a single and relatively thin mechanical barrier. Multi-layered acoustic electric channels, however, have the potential to sustain data and power transmission and could pave the way for a wide range of applications in the oil, nuclear and aerospace industries if further developed.

Signal transmission across the length of water filled pipes using ultrasonic waves have been studied previously, for example, by Li Yinghui, S. O. Harrold and L. F. Yeung, "Experimental study on ultrasonic signal transmission within the water-filled pipes," *Mechatronics and Machine Vision in Practice, Proceedings., Fourth Annual Conference on*, pp. 93-98, 23-25 Sep. 1997. The effects of multipath was studied and a digital link was setup using a non-coherent detection technique.

An On-Off keying based system was implemented by Bacher et. al (C. Bacher, P. Palensky and S. Mahlknecht, "Low cost data transmission via metallic solids for sensor networking," *Emerging Technologies, Proceedings of the IEEE Symposium on*, pp. 193-198, 17-18 Sep. 2005) with an average power consumption of 130 mW to send data across the length of a pipe for a separation of 30 cm using piezoelectric speakers. In another similar application, Lamb waves were used for sending data across the length of an aircraft wing using Frequency Shift Keying (FSK) modulation. H. W. Tomlinson, Jr. and J. B. Deaton, Jr., E. Nieters and F. Ross were awarded the U.S. Pat. No. 7,654,148 for the same on Feb. 2, 2010 ("*Ultrasound Communication System for Metal Structure and Related Methods*").

All these systems, however, use narrowband modulation techniques which are ineffective in frequency selective channels as most of the signal energy may get lost in one of the nulls, or attenuative regions, of a given channel.

One approach to wireless data and power transmission through a barrier is taught by R. Primerano in "*High Bit-rate Digital Communication through Metal Channels*," PhD dissertation, Drexel University, July 2010, hereafter referred to as Primerano. Primerano is interesting because it teaches Orthogonal Frequency-Division Multiplexing or OFDM modulation with a cyclic prefix to send data at a high rate through a metal wall using ultrasound. The use of OFDM compensates for signal loss due to echoes caused by boundaries or due to other incongruities across the channel. See also Y. Fu, C. Tellambura, and W. A. Krzymien, "Transmitter precoding for ICI reduction in closed-loop MIMO OFDM systems," Vehicular Technology, IEEE Transactions on, January 2007.

SUMMARY OF THE INVENTION

This invention provides a method and apparatus for conveying power and data axially along the segments of steel pipe and casing using acoustic waves. The approach can be applied to a wide variety of other geometries including, for example, beams, and planar sheets. Acoustic waves are generated using shear-polarized piezoelectric transducers and injected into the wall of the casing using a transition piece that is acoustically coupled to the wall. This transition piece may be of the same material (e.g. steel or another metal) or of a different material than the casing and can have different shapes, including a wedge or a bar with a rectangular cross-section. The acoustic power is received using a similar structure. Multiple transmitters and/or receivers may be used to improve the efficiency of the link by taking advantage of the fact that the acoustic beam spreads as it moves away from the source. Transverse (shear-horizontal) and/or torsional wave modes are used to limit the power loss to the environment in contact with the interior and exterior wall of the casing/substrate. Higher frequencies, i.e. those well above the audio or near-audio frequency range, are used for communications to minimize the potential interference due to ambient vibrations. These frequencies may also be used for power transfer.

Acoustic-electric channels have been introduced in the recent past to send power and data through metallic barriers. The majority of work to date has dealt with the use of a reverberant acoustic-electric channel formed through a single and relatively thin mechanical barrier. Multi-layered acoustic-electric channels, as well as those formed along a structure, which are highly attenuative and non-reverberant, could have potential applications in aerospace, nuclear, and oil industries, among others. This work considers power and data transmission along the length of a cylindrical pipe both when in air and when filled and immersed in water.

A preferred channel is formed by epoxying steel wedges with attached ultrasonic transducers on the exterior of a 5.2 m long steel pipe with a separation of 4.8 m. The open-ended pipe is placed into a water-filled trough for immersed experiments. The transducers are shear-mode plates which are epoxied to the wedges, producing transverse waves in the wedges and pipe wall, where the wave displacement is oriented in the circumferential direction of the pipe (effectively shear-horizontal). The channel response is measured using a vector network analyzer and it is found that the channel attenuation varies considerably with small changes in frequency. To combat the effects of this frequency selectivity, and address the power constraints, simple modulation schemes using non-coherent demodulation methods are employed for data transmission, including Chirp-On-Off keying (C-OOK). The chirp waveform is a frequency modulated wave whose frequency increases over the bit-interval (either linearly or exponentially), where the width of the chip's spectrum is specified a-priori (10 kHz in this case). The wideband nature of the chirp waveform provides resilience against nulls in the channel response while making it possible to implement a simple non-coherent receiver. The test data link is assembled using an arbitrary waveform signal generator to generate the chirp signal that is applied to the transmit transducer, a demodulator circuit consisting of a ceramic filter and logarithmic amplifier followed by a computer controlled digitizer to capture the signal from the receive transducer, with final processing and bit-decoding done via the computer.

Successful data transmission is achieved across the 4.8 m length of pipe (in air and water) for a data rate of 100 bps (bits per second) using less than ten milliwatts of transmit power. The power required for comparable operation is greater when the channel is immersed in water due to the additional attenuation introduced by energy loss into the water. The modulation scheme is found to be similar in performance to the theoretical non-coherent OOK system using a single frequency tone for the flat channel case. Monte-Carlo simulation results are presented along with the experimental results to establish the bit-error-rate performance of the setup for various signal-to-noise values using the measured physical channel response.

Single layered acoustic-electric channels have been used in the recent past to send power and data through metallic barriers. Multi-layered acoustic-electric channels, as well as those formed along a structure, which are highly attenuative and non-reverberant, could have potential applications in aerospace, nuclear, and oil industries, among others. This work considers data transmission along the length of a cylindrical pipe both when in air and when filled and immersed in water. To combat the effects of frequency selectivity and address the available power constraints, a simple modulation scheme using non-coherent demodulation is employed for data transmission—Chirp-On-Off Keying (Chirp-OOK). The wideband nature of the chirp waveform provides resilience against nulls in the channel response while making it possible to implement a simple non-coherent detector. A test data link is assembled using an arbitrary waveform signal generator to generate the chirp signal which is then applied to the transmit transducer, a demodulator circuit followed by a computer controlled digitizer is used to capture the signal from the receive transducer, and final processing and bit decoding are done via the computer. Successful data transmission is achieved across the 4.8 m length of pipe (in air and water) for a data rate of 100 bps using less than 10 mW of transmit power. Monte Carlo simulation results suggest that the bit error rate performance of the scheme matches quite closely with the theoretical results.

In some embodiments of the invention, power is transmitted through the channel, in addition to signals. Most commonly power is sent in one direction, and signals are sent in the opposite direction or in both directions. Transducers are typically used to convert electrical energy into vibrational energy, such as in the form of shear-horizontal acoustic waves. The shear-horizontal waves then travel from the transmit assembly through the substrate towards the receive assembly. Vibrational energy which arrives at the receive assembly transducer is converted from the vibrational form to alternating-current electrical energy (AC) at the receive transducer. The recovered electrical energy may then be used to power circuitry, may be converted from AC to DC current, and can be stored for later use.

A preferred method and arrangement for transmitting data such as binary data (and also optionally power) axially along a length of metal pipe includes some or all of the following elements. An acoustic-electric channel including a metal pipe, the pipe being a substrate. A first assembly coupled to the pipe, and a second assembly coupled to the pipe and axially spaced apart from the first assembly. Each first and second assembly comprises a transition piece coupled to the pipe, a transducer coupled to the transition piece, and electronics communicatively linked to the transducer. The acoustic-electric channel has a coherence bandwidth (CB).

A method of using this arrangement preferably includes some or all of the following. A first transducer generating wideband shear-horizontal waves, the shear-horizontal waves being modulated to form a series of Chirp signals comprising binary data, wherein each Chirp signal varies its frequency over the course of the Chirp signal. Each Chirp signal has an initial frequency $f_i$, and each Chirp signal has a value $f_{\Delta max}$ which is a maximum frequency deviation from the starting frequency Preferably, $f_{\Delta max}$ is greater than the coherence bandwidth (CB) of the acoustic-electric channel. The shear horizontal waves generated by the first transducer propagate through the first transition piece, into the pipe, thence into the second transition piece and the second transducer. The second transducer receives the waves and turns the received shear horizontal wave energy into received electrical energy. The received electrical energy is demodulated as binary data, and the presence and absence of Chirp signals over time are interpreted as binary data by the second electronics.

In some embodiments at least one and preferably both of the first transition piece and the second transition piece comprises a metallic triangular wedge coupled to the pipe.

In preferred embodiments the second electronics comprise a DC rectification circuit. The received electrical energy is AC electrical energy, and the received electrical energy is converted from AC electrical energy to DC electrical energy by the DC rectification circuit.

The acoustic-electric channel may comprise a plurality of second assemblies coupled to the pipe, each comprising a second transducer, and all axially and/or circumferentially spaced apart along the pipe from one or more first assemblies. The second electronics then preferably comprise a multi-element rectification circuit. In some arrangements a circuit between the second transducers and the multi-element rectification circuit comprises a voltage transformer.

In alternative applications the first transducer sends a plurality of Chirp signals at the same time, and frequency ranges of the Chirp signals sent at the same time substantially do not overlap or do not overlap at all. Then the plurality of Chirp signals are interpreted as data by the second electronics.

The received data may be demodulated using coherent or non-coherent reception.

In preferred embodiments where the received energy is received as non-coherent signals, the process includes some or all of the following steps: one or more second transducers receiving vibrational energy and converting it to electrical energy (i.e. signals); receiving electrical signals from one or more second transducers; passing said electrical signals into one or more band pass filters (in alternative embodiments, matched filters), with the filter discarding electrical signals outside a filter wavelength window, and passing on electrical signals which are within a filter wavelength window. Electrical signals passed on from said one or more band pass filters then pass through an envelope detector circuit, with the envelope detector circuit outputting a signal envelope of signals it receives. The signal envelopes may then continue on to an integrate-and-dump circuit which integrates the signal envelope over a symbol interval into a symbol value, and passes on the symbol value. In some embodiments the receiver comprises a plurality of branches, with each branch including a band pass filter, an envelope detector circuit, and an integrate-and-dump function.

Alternative methods of transmitting binary data axially along a length of metal pipe use on-off keying. Received electrical energy is received as non-coherent signals using a receiver. Signals may then proceeded through band pass filter(s), envelope detector(s), and integrate and dump circuit(s), as elaborated elsewhere. The system detects the presence or absence of a series of signal values over time, and interprets the presence or absence of signals as one of a '1' and a '0', respectively.

In some methods and arrangements using on-off keying, only a single stream of Chirps is intermittently transmitted from the first transducer to the second transducer. The presence and absence of Chirp signals over time is interpreted as a string of '1' and '0' values.

Alternative embodiments of the invention include broader methods of and apparatus for transmitting data along a substrate. These methods and arrangements include an acoustic-electric channel, which preferably include some or all of the following elements: a solid substrate; a first assembly coupled to the substrate, and a second assembly coupled to the substrate spaced apart from the first assembly. The first assembly preferably comprises: a first transition piece coupled to the pipe, a first transducer coupled to the first transition piece, and first electronics communicatively linked to the first transducer. The second assembly preferably comprises: a second transition piece coupled to the pipe, a second transducer coupled to the second transition piece, and second electronics communicatively linked to the second transducer. Each acoustic-electric channel has a coherence bandwidth (CB). In preferred applications of the apparatus, the first transducer generates wideband shear-horizontal waves, and the shear-horizontal waves are modulated to form a series of wideband signals comprising data. Each wideband signal has a maximum frequency and a minimum frequency, and the difference between the maximum frequency and minimum frequency is $f_A$. Most preferably $f_A$ is greater than the coherence bandwidth (CB) of the acoustic-electric channel. Typically shear horizontal waves generated by the first transducer propagate through the first transition piece, into the substrate, thence into the second transition piece and the second transducer. The second transducer turns received shear horizontal wave energy into received electrical energy. The received electrical energy is demodulated as data.

In preferred embodiments the substrate comprises a metal pipe, such as a steel pipe. Preferably one or both transition pieces are wedge shaped.

The shear-horizontal waves can be modulated as Chirp signals, where each Chirp signal varies its frequency over the course of the Chirp signal. In other embodiments, the shear-horizontal waves are modulated as direct-sequence spread signals. In both cases the data may be transmitted using on-off keying.

In some embodiments where the acoustic-electric channel includes a plurality of second assemblies coupled to the substrate, each comprising a second transducer, and all of which are axially and/or circumferentially spaced apart on the substrate from one or more first assemblies. In such cases, preferably, the second electronics include a multi-element rectification circuit.

In alternative embodiments the data is transmitted using orthogonal frequency division multiplexing (OFDM), and the transmission using OFDM comprises the first transducer generating a plurality of signals on a plurality of subcarriers.

It will be understood that the present invention includes any combination of the various features of novelty which characterize the invention and any combination of equivalent features. The embodiments which follow are presented for the purposes of illustration only and are not meant to limit the scope of the present invention. Thus, all the features of the embodiments which precede and follow are interchangeable so that each element in each embodiment may be applied to all of the embodiments taught herein.

These and other non-limiting aspects and/or objects of the disclosure are more particularly described below. The various features of novelty which characterize the invention are pointed out with particularity in the claims annexed hereto and forming a part of the disclosure. For a better understanding of the invention, its operating advantages and specific benefits attained by its uses, reference is made to the accompanying drawings and descriptive matter in which exemplary embodiments of the invention are illustrated.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION OF THE PREFERRED EMBODIMENTS

Acoustic-Electric Channels

Figure 1:
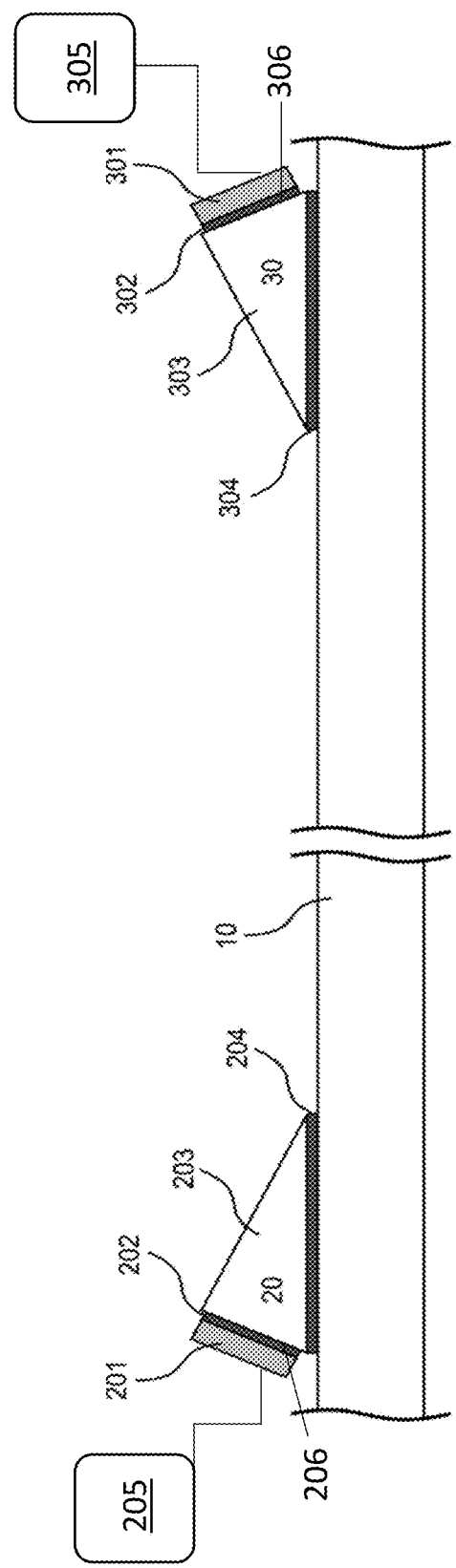
FIG. 1 is an acoustic-electric channel arrangement.
Figure 2:
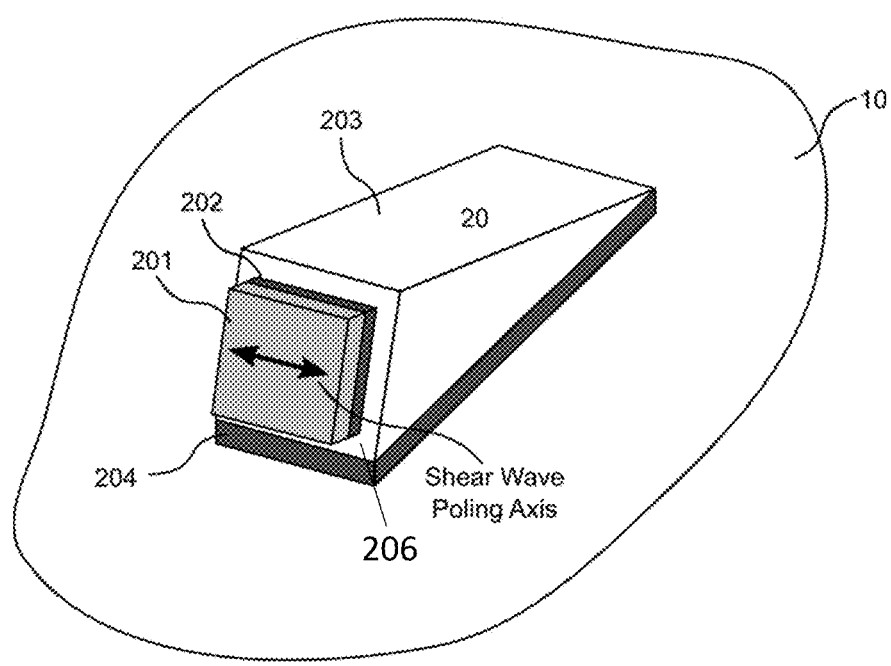
FIG. 2 is an acoustic transmit assembly, with arrows indicating a preferred particle displacement axis.

Referring now to the drawings, in which like reference numerals are used to refer to the same or similar elements, FIG. 1 schematically shows a simple acoustic electric channel for use with this invention. The channel includes a substrate 10, a transmit assembly 20, and a receive assembly 30. The assemblies depicted each include four basic components: a transducer 201,301 (e.g. a shear plate transducer), shear plate-wedge acoustic couplant 202,302, acoustic wedge 203,303 transition piece (or transition piece of alternative shape), and wedge-substrate acoustic couplant 204, 304. Each transducer is linked to transmit 205 and receive 305 electronics, which may include sensors, signal processing electronics, power storage, signal transmission and reception elements, and/or other components which will vary between embodiments. FIG. 2 presents an isometric view of the transmit assembly 20, with the preferred particle displacement axis of the generated shear wave denoted by a double-sided arrow. The substrate 10 may be metal, such as steel or a blend including steel. The substrate 10 may be, for example, a pipe or casing, a flat substrate such as a flat piece of metal, or a portion of a vehicle such as a ship, submarine, or aircraft. The couplants 202,204,302,304 may be epoxy or another adhesive or a gel. The wedges may be held against the substrate by pressure, without using an adhesive, so that each wedge and the substrate are in direct contact. The transition pieces may be shaped as wedges 203,303, or may be a shape other than triangular, such as a rectangular solid with an upper corner edge "removed" to form an angled face. The transition pieces may be acrylic or a metal such as steel. The transition pieces may be made of the same or a different material as the substrate. The transition pieces may be an integral part of the substrate or be welded or soldered to the substrate, as opposed to being glued to the substrate.

Preferably the propagation mechanism for acoustic energy from the transmitter and receiver is designed such that energy loss to the environment (attenuation) is minimized. To that end, circumferentially-poled shear (shear-horizontal) waves are preferred to transmit the energy. Compare the arrangement in FIG. 1 and the arrow showing the direction of transducer poling in FIG. 2. These waves are preferably used in place of other waves, such as radially-poled shear (shear-vertical) waves and longitudinal (compressional) wave. This advantage is at least partially because the particle displacement in compression and shear-vertical waves both have a significant component which causes the surface of a pipe, plate, or other substrate 10 to vibrate in a direction non-parallel with the surface or plane of the substrate 10. This is particularly relevant in arrangements where the pipe/substrate 10 is submerged in a liquid, where non-planar vibration of the surface (i.e. into and away from the surrounding liquid) dissipates energy into the liquid. Using shear-horizontal waves, in contrast, the movement of the surface is mostly or entirely planar, resulting in minimal energy loss to the surrounding liquid.

In order to generate/receive shear-horizontal waves, a number of methods may be applied. One method for the generation of shear waves is the use of a longitudinal transducer (as opposed to a shear transducer) coupled to a transition wedge, which is in turn coupled to the substrate 10. The wedge can be composed of material with specific properties (such as longitudinal and shear speeds of sound with respect to the substrate) such that at certain wedge incident angles, longitudinal waves in the wedge will be converted into shear waves when they pass into the substrate. However, using that method, it is only possible to generate shear-vertical waves. As mentioned, shear-horizontal waves are more preferred for this invention.

To produce shear-horizontal waves in the plate/pipe, several alternate methods may be employed: electromagnetic-acoustic transducers (EMAT), and shear-poled piezoelectric plates, among others. This invention has been specifically reduced to practice using shear-poled piezoelectric plates 201,301, also called "shear plates" 201,301. Piezoelectric plates are piezoelectric transducers. Shear-poled piezoelectric plates are especially preferred because the typically have high electromechanical coupling efficiency, although EMAT and other transducer types are also within the scope of this invention. Shear plates are individually capable of producing both shear-horizontal and shear-vertical waves, depending on the orientation of coupling. Shear plates are preferably coupled to transition pieces 203,303 to allow for the generated acoustic energy to be focused properly. Angled and rectangular transition pieces 203,303 have been shown to effectively inject and capture energy into and from substrates 10. Transition pieces 203,303 which are composed of the same or similar material as the substrate 10 are particularly preferred so as to minimize acoustic energy reflections at the transition piece-substrate interface. For example, steel wedge shaped transition pieces 203,303 coupled directly to a steel substrate are particularly preferred.

Transition pieces preferably include an angled surface 306 for mounting a transducer, the transducer therefore also being at an angle with respect to the substrate surface below. Preferably the angled face 206,306 has an angle of approximately 75° with respect to the substrate 10, where the face being parallel to the substrate is 0° and perpendicular to the substrate being 90°. Preferred angles for the angled face, and therefore also for a transducer face, include the following ranges: 40-85, 50-85, 55-85, 60-85, 60-80, 65-85, 65-80, 70-80, and 70-85.

As discussed elsewhere, horizontal-shear wave transmission is preferred to avoid losing energy to air and (especially) liquid surrounding the substrate. Acoustic interfaces are therefore preferably designed for transmitting (to the extent possible) only or substantially only shear-horizontal waves. This includes interfaces between transducers and wedges or other transition pieces, and interfaces between transition pieces and substrates. Preferred interfaces include (i) rigid adhesives such as epoxy, (ii) highly viscous gels, such as molasses, and (iii) very strong coupling force holding the elements together by compression or pressure with no intermediary coupling material.

With increasing distances between transmit 20 and receive 30 assemblies, acoustic wave energy injected into the substrate 10 will diffuse to cover a larger area, a phenomenon known as beam spreading. As a result, only a small fraction of the total input energy will typically be available at the receive assembly. In order to increase the acoustic electric channel's energy transfer efficiency, some preferred embodiments include multiple receive assemblies 30, multiple transmit assemblies 20, or both. When transmitting along the axis of a pipe 10, these multiple transmit and/or receive assemblies can be radially duplicated, i.e. positioned around all or part of a circumference of the pipe. Alternatively, or in addition, the assemblies 20,30 may be located at different axial locations in a continuous line or a spaced line, forming multiple "layers" of transmitters and/or receivers.

Power Transmission

Some embodiments transmit power through the channel for powering electronic components such as sensors, processors, transducers, batteries, etc. Power transmission may be instead of or, more often, in addition to, transmitting signals. This is especially useful to provide power to sensors and other components which are in remote locations, or otherwise not easily accessible by physical wires, such as along or inside of pipes and casings in an underground well. Commonly, power is sent in a first direction (e.g. down an underground pipe) and signals are transmitted in the opposite direction (e.g. in the direction of the surface). In another example, power is transmitted in a first direction, and signals are transmitted in both directions.

In preferred embodiments, in order to deliver power across an acoustic-electric channel, power is applied to the transmit assembly 20 using a high-frequency power amplifier as a continuous-wave (e.g. sinusoidal, square, etc.) electrical alternating-current (AC) signal. Typically the power is applied to the transmit transducer(s) 201, which then produce vibrational energy. The channel usually conveys vibrational signals from the transmitter to the receiver far more effectively at some frequencies than others. As a result, it may be advantageous to adjust the transmit frequency to optimize performance. Alternately, the transmitter may spread the power and/or transmissions over a range of frequencies, ensuring that some frequency in the range coincides with at least one frequency of efficient transfer for that channel. For example, transmission frequency can be varied linearly over time over a frequency range, as in the case of a "chirp" waveform. See FIG. 7. Alternately, a continuous-wave signal may be frequency, phase, or amplitude modulated in a manner to widen its bandwidth. In preferred embodiments transducers 201 (e.g. shear plate, EMAT, etc.) convert electrical energy into vibrational energy in the form of the desired shear-horizontal acoustic waves. The shear-horizontal waves then travel from the transmit assembly (or assemblies) 20 through the substrate 10 towards the receive assembly (or assemblies) 30. In transit, some energy is lost to 1) material attenuation, 2) non-direct propagation (energy diffusion), and/or 3) energy escaping through the substrate's boundaries (e.g. into air or liquid). What vibrational energy arrives at the receive assembly (or assemblies) is converted from the vibrational form back to alternating-current electrical energy (AC) at the receive transducer 301. The recovered electrical energy may then be used directly to power circuitry 305, converted from AC to DC (direct current), and/or stored for later use in a capacitor or battery (generally required AC-to-DC conversion as well) 305.

In some embodiments, signals are sent using wideband while power is transmitted using narrow band transmission, preferably at a frequency which is selected as being particularly effective.

Matching Networks and Rectification Circuits

In a preferred embodiment the transmit transducer 201 is powered by a low output impedance (e.g. less than 50Ω, 40Ω, 30Ω, 20Ω, or 10Ω) amplifier 205 in order to minimize energy loss. If the amplifier has a large specific output impedance (e.g., 50Ω or more) and/or the transducer's impedance is largely capacitive or inductive then it is useful to introduce additional electrical components between the amplifier and the transmit transducer in order to minimize electrical reflections generated by the mismatch of the amplifier's impedance and the transducer's impedance. The totality of these additional components is known as a "matching network."

If the electrical AC energy recovered by the receive assembly 30 is to be used as an AC source, a similar matching network will be required to eliminate electrical reflections between the receive transducer(s) 301 and the attached circuit.

Preferably, when converting the recovered electrical energy from AC-to-DC, a DC rectification circuit is used. To compensate for large acoustic-electric channel inefficiencies and/or limited input power availability, efficient rectifiers are required, i.e. the power loss in the rectifier should be minimal. The invention is not limited to any specific rectification arrangement. Both passive (e.g. diodes) and active (e.g. switches, switches with inductors, etc.) may be used. Given the ultra-low power levels generated by receive transducers 301 in many applications, it is sometimes necessary to introduce a voltage transformer at the output of the receive transducer(s) 305 in order to increase the voltage(s) to a point where it is possible to efficiently operate a diode.

A diode is a required component in many AC-to-DC rectifier designs. Larger input voltages minimize losses by minimizing the relative value of the diode forward voltage drop.

If multiple transmit assemblies 20 are used, then each transmit transducer 201 may be connected in series or parallel to the power amplifier, although the scope of the invention includes alternative connection topologies, including phased-array applications. If multiple receive assemblies 30 are used, the connection of all receive assemblies 30 to the receiver circuitry may generally not be of a simplistic series or parallel topology. This is because each receive assembly may have an AC signal phase which does not match the AC signal phase of the other receive assemblies 30, which can cause a significant loss of efficiency unless re-phasing circuitry is used prior to the summing of the receive transducer 301 outputs. In a system where DC power is required, it is possible to add the power from each receiver after DC rectification and regulation. Alternatively, a multi-element rectifier may be used which allows for the energy from each receive transducer to be added prior to regulation.

Figure 3:
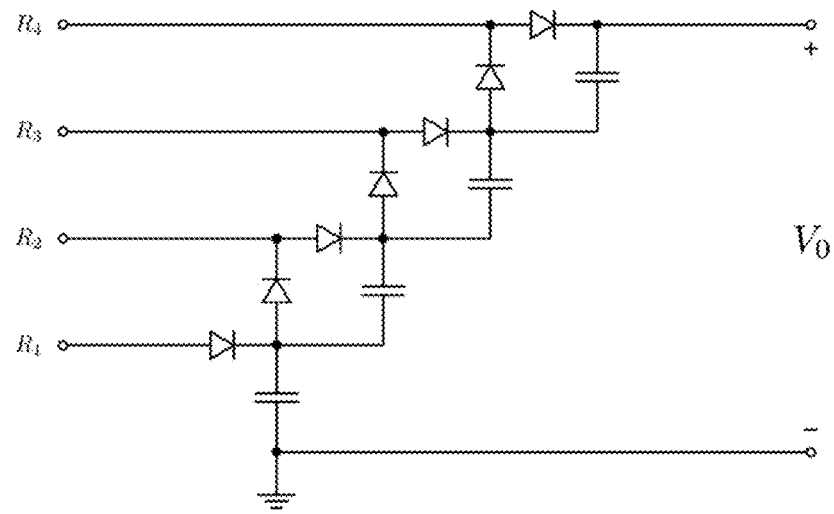
FIG. 3 is a multi-element rectifier for AC→DC current conversion for use with multiple receivers (Ri) that have one grounded leg (not shown) and one free leg.

Two general topologies for multi-element rectifiers are, without limitation, especially preferred. FIG. 3 shows a multi-element circuit for rectification of AC energy from four receivers ($R_1$-$R_4$), where each receiver has a grounded leg, leaving only one signal connection. The receivers must present an open circuit (infinite impedance) at DC, a trait common to piezoelectric transducers. This open circuit is required as each receiver other than the first ($R_1$) will be DC biased by the voltage across the totality of the rectifier capacitors occurring on receivers prior to the specific receiver in the circuit. For example, receiver $R_3$ will be biased by the voltage contained by the rectification capacitors charged by receivers $R_1$ and $R_2$.

Figure 4:
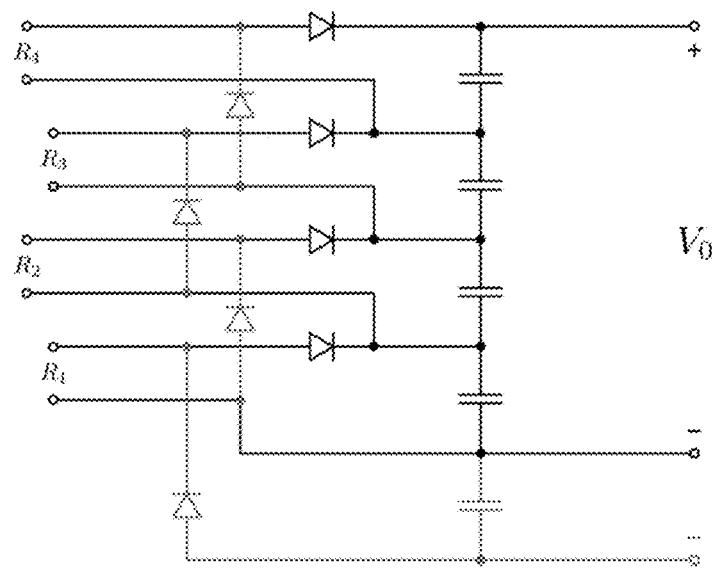
FIG. 4 is a multi-element rectifier for AC→DC current conversion for use with floating receivers (Ri), with lighter grey colored components being optional.

FIG. 4 presents a multi-element circuit for rectification of AC energy from four receivers ($R_1$-$R_4$), where each receiver is floating, allowing both electrical connections to each receiver to be used in the circuit. This floating condition may be achieved by coupling the signal from each transducer using a transformer, and/or by ensuring that there are no electrical connections between the electrodes of different transducers (such as would occur if one electrode for each transducer was electrically connected to an electrically-conductive wall). Ignoring the gray components in the FIG. 4 circuit diagram, a series set of capacitors are charged individually via a single receiver, resulting in a summed output voltage $V_O$. The gray components in the circuit diagram are optional, increasing the efficiency for a majority of applications although detrimental to some other embodiments.

For both preferred multiple receiver element rectification circuits (FIG. 3 and FIG. 4), the connections to the receivers may or may not be direct, with sub-circuits possible between $R_i$ and its connection to the rectifier circuit. A preferred component to add between the receiver and the circuit (e.g. when using the receiver in the schematic in FIG. 4) is a voltage transformer to allow for incremental rectified voltage to be scaled respectively.

Power Transfer Efficiency in Test Channel

Power transmission has been demonstrated over several different acoustic-electric channels.

Figure 5:
FIG. 5 is an assembled acoustic-electric power transmission channel.

One exemplary channel was constructed on a 5.2 m (17 ft.) long steel pipe substrate 10 having nominal outer diameter of 0.25 m (10 in) and a wall thickness of 18 cm (0.7 in), as shown in FIG. 5. The transmitter 20 and receiver 30 assemblies used were identical, with the shear transducers (15×15×1 mm square plates, 1 MHz resonant) attached to a transition piece of a wedge design, with the transducers each making a 75° angle with the pipe's surface. The transducers and transition pieces were coupled to the transition pieces and pipe 10 surface, respectively, using a two-part epoxy. The transmitter 20 and receiver 30 assemblies were affixed to the pipe with a separation of 1.2 m (4 ft.).

Figure 6:
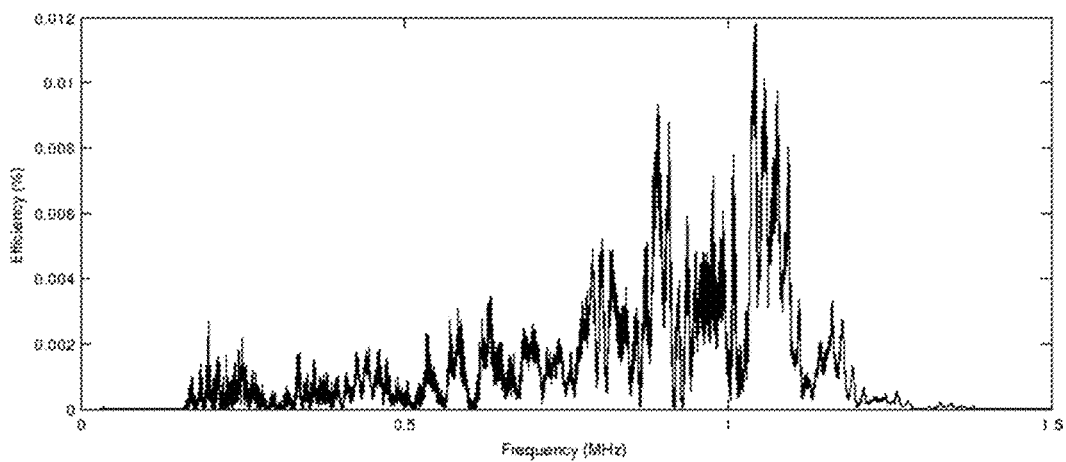
FIG. 6 is a graph of power transfer efficiency for an acoustic-electric channel having an ideal low-impedance amplifier (0Ω output) transmitter and 50Ω attached to the receiver, peak efficiency being 0.011% energy transfer at 1.043 MHz.

The assembled acoustic-electric channel was characterized using a network analyzer. From the characterization data, the power transfer efficiency for the case of an ideal low-impedance amplifier (0Ω output) transmitter and 50Ω attached to the receiver was calculated, and is illustrated graphically in FIG. 6. The efficiency for this channel reached a maximum of about 0.012% at 1.043 MHz. In order to validate this number, a low-impedance amplifier was attached to the transmit transducer and a power meter (50Ω) was attached to the receive transducer. When applying 11 W to the transmitter, the power meter measured an output of 1.1 mW, a measured efficiency of 0.010%.

Another exemplary channel was constructed on a 5.2 m (17 ft.) long steel pipe substrate 10 having nominal outer diameter of 0.25 m (10 in) and a wall thickness of 18 cm (0.7 in), as shown in FIG. 5. The transmitter 20 and receiver 30 assemblies used were identical, with the shear transducers (15×15×4 mm square plates, 250 kHz resonant) attached to a transition piece of a wedge design, with the transducers each making a 70° angle with the pipe's surface. The transducers and transition pieces were coupled to the transition pieces and pipe inner diameter 10 surface, respectively, using a two-part epoxy. The transmit and receive assemblies were affixed to the pipe with a separation of 4.6 m (15 ft.). Eight receiver 30 assemblies were arranged circumferentially around the pipe surface. Only one transmitter 20 assembly was attached. The pipe was submerged.

Figure 27:
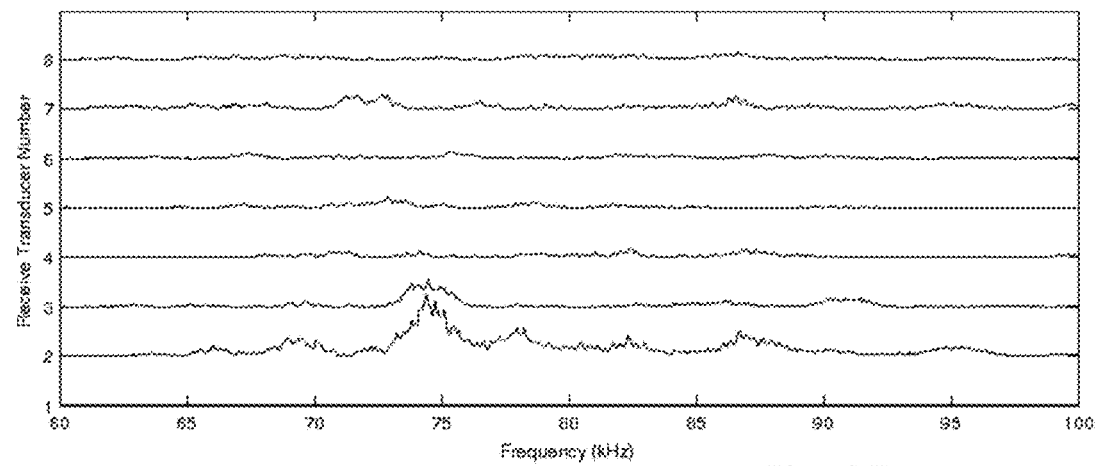
FIG. 27 is a graph of relative power transfer efficiency for eight acoustic-electric channels having an ideal low-impedance amplifier (0Ω output) transmitter and matched loads attached to the receiver. Each channel used the same transmitter assembly.
Figure 28:
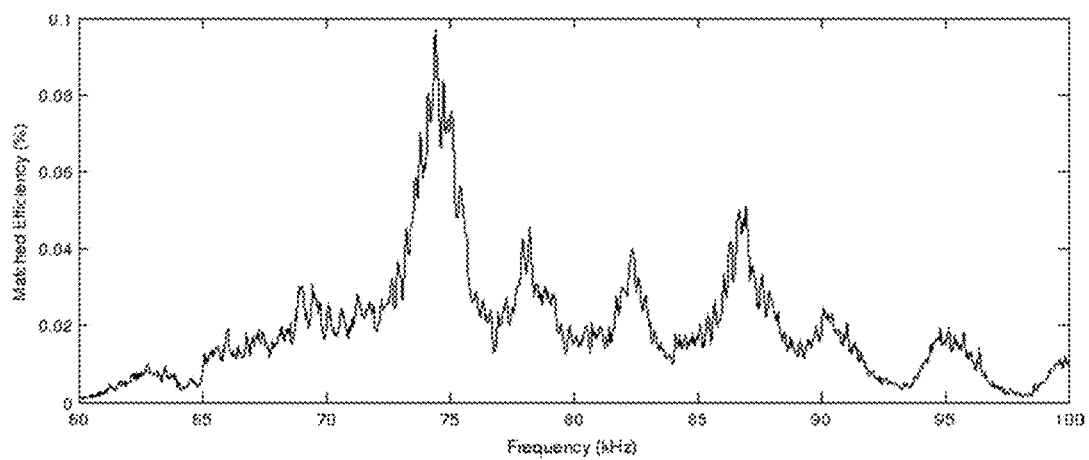
FIG. 28 is a graph of the summed power transfer efficiency for the eight acoustic-electric channels in FIG. 27.

Each independent channel constructed by the one transmit and one of the eight receive assemblies were characterized using a vector network analyzer. From the characterization data, the power transfer efficiency for the case of an ideal low-impedance amplifier (0Ω output) transmitter and matched receiver electronics was calculated. The relative magnitudes for each channel are illustrated graphically in FIG. 27. A summation of the efficiency of each of the receiver assemblies is illustrated graphically in FIG. 28. In the described ideal case, the total summed efficiency reaches a maximum of approximately 0.01% near 75 kHz.

Power transfer was demonstrated using a low impedance amplifier and matching network attached to the transmitting assembly. Power was received by the receiver assemblies using independent voltage doublers attached to each assembly. The voltage doubler outputs were attached in parallel and fed to a storage 22 mF storage capacitor. When transmitting 18 W from the transmit assembly, the system was able to charge the 22 mF capacitor from 3.8 V to 5.1 V in approximately 35 seconds, an average power delivered of 3.6 mW and average power efficiency of 0.02%.

Data Communication

Preferred channels created using the techniques described here are often highly frequency selective as a result of reflections that occur at the many interfaces within the structure that present acoustic impedance mismatches, i.e. different acoustic impedances. Frequency selectivity is visible in FIG. 6, which graphs frequency vs. power transfer efficiency for an exemplary channel. To communicate effectively over such frequency sensitive channels, it is necessary to use a system that can either adapt to specific channel conditions, or which is relatively insensitive to these conditions.

In the case of an adaptive system, the transmit signal can be selected to best utilize the channel by, for instance, choosing an advantageous carrier frequency or modulation signal. Optimum frequencies can be selected by testing different frequencies for each arrangement, for example, optionally repeating the testing periodically. The receiver may also adapt to the channel, using techniques such as adaptive equalization.

One useful method is Orthogonal Frequency Division Multiplexing (OFDM) in which the transmit bandwidth is essentially divided into multitude of parallel channels, each with its own signal on its own subcarrier. The amount of data (e.g. bits/second) on each subcarrier, and/or the transmit power of each subcarrier, can be selected to optimize the channel use through the processes of bit-loading and power-loading, respectively. Orthogonal frequency-division multiplexing is a method of encoding data on multiple carrier frequencies. OFDM has developed a method of wideband communication. OFDM is a frequency-division multiplexing (FDM) scheme which can be used as a digital multi-carrier modulation method. A large number of closely spaced orthogonal sub-carrier signals are used to carry data on several parallel data streams or channels. Each sub-carrier is can be modulated with a conventional modulation scheme (such as quadrature amplitude modulation or phase-shift keying) at a low symbol rate, maintaining total data rates similar to conventional single-carrier modulation schemes in the same bandwidth. In OFDM, the sub-carrier frequencies are chosen so that the sub-carriers are orthogonal to each other, meaning that cross-talk between the sub-channels is eliminated and inter-carrier guard bands are not required. This greatly simplifies the design of both the transmitter and the receiver; unlike conventional FDM, a separate filter for each sub-channel is not required.

Communication systems can also be designed to be less sensitive to channel conditions. In preferred systems the transmit signal is designed to operate effectively for general channel characteristics, rather than for the specific conditions that may be present in a particular installation at a particular time. In a frequency selective channel, the use of a narrowband modulation coupled with an unfortunate selection of a transmit frequency that coincides with a portion of the channel transfer function with low gain (i.e. poor transmission efficiency) can make the data link inoperable. Thus, in such situations, improved wideband modulation formats are desirable.

In this context, "wideband" means that the transmit signal is significantly larger in bandwidth than the coherence bandwidth of the channel to be used. Wideband transmission makes it unlikely that the transfer function or efficiency of the channel is low (or high) over the full bandwidth of the signal and, therefore, unlikely that the complete signal is excessively attenuated by the channel. I.e., wideband transmission will overlap at least some bandwidth which has sufficiently high transmission efficiency for effective communication.

There are a number of ways to produce a wideband signal. These include using "chirp" signals (in which the carrier frequency changes linearly or exponentially) with time during a transmit symbol interval), direct-sequence spread signals (in which the signal is modulated by a higher-rate pseudorandom sequence to spread its bandwidth), frequency-hopping spread spectrum transmission (in which the carrier frequency "hops" in a pseudorandom way over a range of frequencies), and pulse modulation transmission (in which the information is carried by sequences of short pulses which have a large bandwidth).

In a typical oil well application, the amount of data to be transferred is relatively small and can be achieved using low data rate signaling formats, which makes wideband, non-adaptive modulations particularly attractive. Wideband, non-adaptive modulations generally require relatively simple hardware which is easier to assemble and to operate in a downhole environment than more complex alternatives. Chirp (FIGS. 7-8) and direct sequence signals (FIG. 8) advantageously can be demodulated using coherent techniques as well as non-coherent energy detection. Coherent techniques require the receiver to have a local oscillator that is locked in phase and frequency to the carrier of the received signal (i.e. a carrier recovery circuit). Non-coherent techniques do not require this expensive and complex carrier recovery circuit and, consequently are simpler to implement. The cost of using non-coherent techniques is often a loss in performance, i.e. an increase in the level of transmit power required for a given system data error rate.

Chirp Wideband Modulation

A preferred communications system can be implemented using wideband waveforms by encoding transmit data into the carrier frequency. A chirp is a modulated signal whose frequency increases or decreases over time. The change is typically over a short period, such as on the order of a millisecond. In a preferred chirp-based system that uses chirps with a frequency that increases linearly with time, the signal may be expressed as $$s(t) = A \cos [2\pi(f_i + \alpha t)t + \phi],$$

where A is the signal amplitude, $f_i$ is the initial carrier frequency that is associated with transmit symbol i, $\alpha$ is a scale factor that determines the chirp frequency range, t is time, and $\phi$ is an arbitrary phase. In a binary system, there are two values for $f_i$, one is transmitted to convey a data bit of '0' and the other to send a data bit of '1'. In multiple spectra chirp systems (e.g. FIG. 8) these frequencies $f_i$ for different spectra chirps are preferably selected to ensure that the chirps do not overlap in frequency, so that they can be received individually with minimal interference. For a 4-ary system (i.e. four possible chirps transmitted), there are 4 $f_i$ which, again, are selected to ensure that the chirps do not overlap in frequency. A M-ary system uses M different values of $f_i$. M may be 1, 2, 3, 4, 6, 8, 10, 12, 16 or another number.

Figure 7:
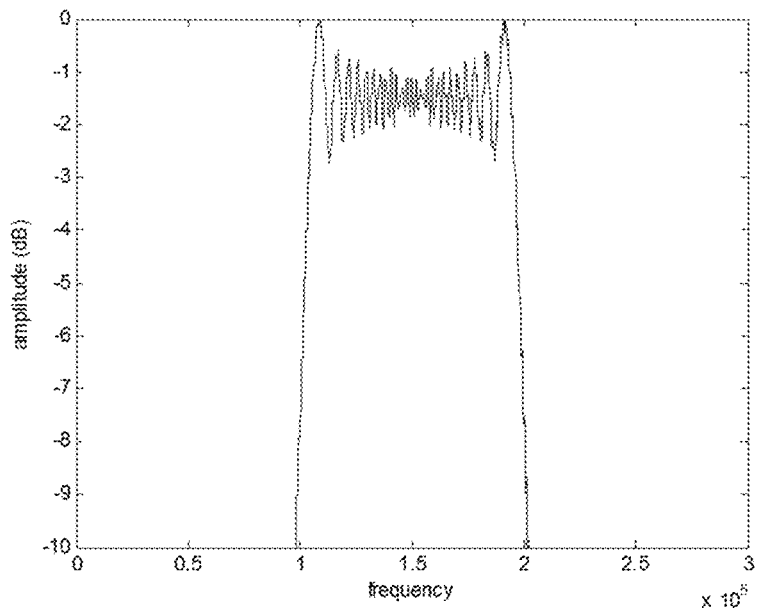
FIG. 7 is a graph of frequency spectrum for a chirp signal which goes from 100 kHz to 200 kHz in 1 millisecond.

FIG. 7 shows the frequency spectrum of a single chirp that spans a frequency range from 100 kHz to 200 kHz in 1 ms. For this signal, $f_i$=100 kHz. This type of chirp can be used to send binary data by transmitting a chirp to indicate either a '0' or a '1' and not transmitting a chirp, i.e. not transmitting a signal at all, to indicate the opposite bit. For example, transmitting a chirp to indicate '1' and no chirp to indicate '0', or vice versa. This approach is an example of on-off keying. A receiver will detect the presence or absence of the chirp signal in each symbol interval to receive the stream of data, a stream of 0's and 1's in this embodiment.

Figure 8:
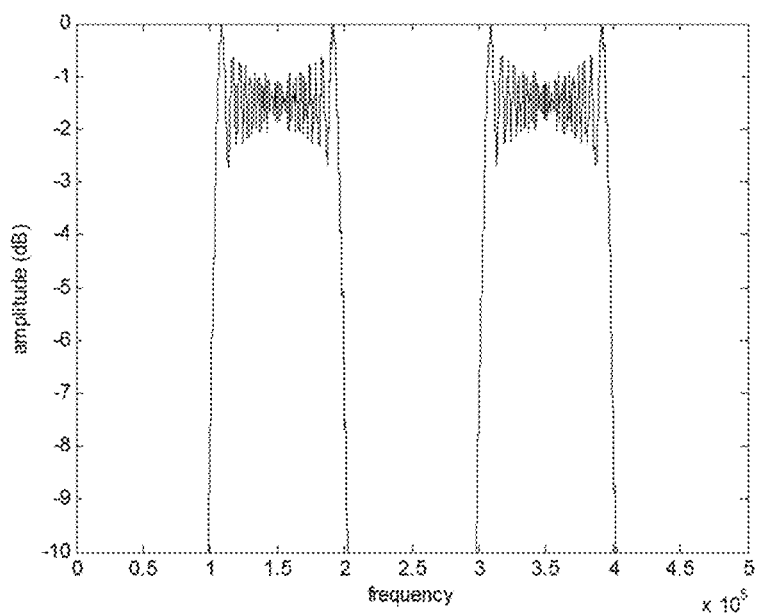
FIG. 8 is a graph of frequency spectrums for two chirp signals having two different starting frequencies.

FIG. 8 shows the frequency spectra of two chirps, one starting at $f_1$=100 kHz and the second starting at $f_2$=300 kHz, where the first chirp is associated with a data bit of '0' and the second is associated with a data bit of '1'. A receiver 305 (typically associated with a receive assembly 30) will detect which signal was sent in order to determine the data bit that was sent. Using more than two starting frequencies, e.g. N possible starting frequencies, means that more bits of information can be sent in each symbol interval (i.e. during the same time period). Likewise, it is possible to transmit multiple chirps with different starting frequencies at the same time to increase the number of possible signals and provide more powerful data transmission. For N possible starting frequencies and simultaneous transmission, there are $2^{N-1}$ possible signals that can be sent in each symbol interval.

Direct Sequence Wideband Modulation

Figure 9:
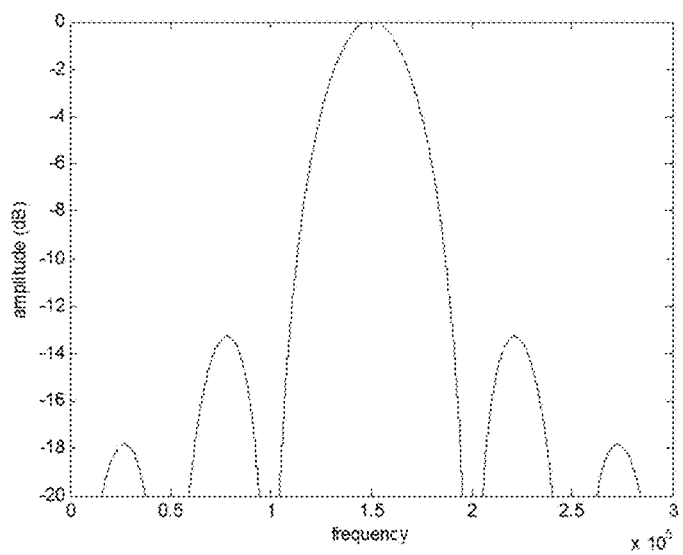
FIG. 9 is a graph of frequency spectrum for a direct sequence signal with a carrier frequency of 150 kHz and a chip rate of 50 kHz.

A preferred direct sequence wideband modulation system uses a pseudorandom sequence of bits (called chips) to modulate a continuous-wave carrier. Maximum-length sequences (m-sequences) are often used, but other sequences will also work. In a preferred embodiment, the signal can be expressed as $$s(t)=Apn(t)\cos(2\pi f_i t+\phi),$$

where pn(t) is a pseudorandom sequence consisting of +1s and −1s, A is the signal amplitude, $f_i$ is the initial carrier frequency that is associated with transmit symbol i, t is time, and $\phi$ is an arbitrary phase. FIG. 9 shows the frequency spectrum of a direct sequence signal with a carrier of 150 kHz and a chip rate of 50 kHz. As with chirp transmissions, different $f_i$ may be used to transmit different data symbols, and these $f_i$ are preferably selected to ensure that the signals associated with different data symbols do not excessively overlap in frequency in order to minimize interference. The direct sequence signal, like the chirp signal, typically and preferably occupies a wide bandwidth. However, the direct sequence spectrum may be less well confined than that for the chirp, with sidelobes extending out in both directions. As a result, there will generally be some degree of spectral overlap, though selecting $f_i$ that are sufficiently far apart will make the overlap have only a small, tolerable impact on receiver performance. The spectrum of the main lobe is not as flat as in chirp transmission. By applying "pulse shaping" to the signal pn(t) (i.e. replacing the rectangular pulses with smooth pulses such as a raised-cosine pulse), it is possible to suppress the sidelobes and flatten the main lobe of the frequency response.

Non-Coherent Signal Reception

The same or similar non-coherent receiver structures can be used for both the chirp and direct sequence signals. Coherent transmissions are transmissions where the receiver "knows" certain characteristics regarding the data being sent, such as the carrier phase and frequency. This makes it easier to distinguish signal from noise. Coherency typically means having some timing recovery mechanism. In contrast, non-coherent receivers do not need to know the carrier phase and frequency, and therefore non-coherent signal reception can be less complex.

As mentioned, coherent techniques can require the receiver to have a local oscillator that is locked in phase and frequency to the carrier of the received signal. Non-coherent techniques do not require this locked local oscillator and, consequently are simpler to implement. The cost of using non-coherent techniques is a loss in performance, i.e. an increase in the level of transmit power required for a given system data error rate.

Figure 10:
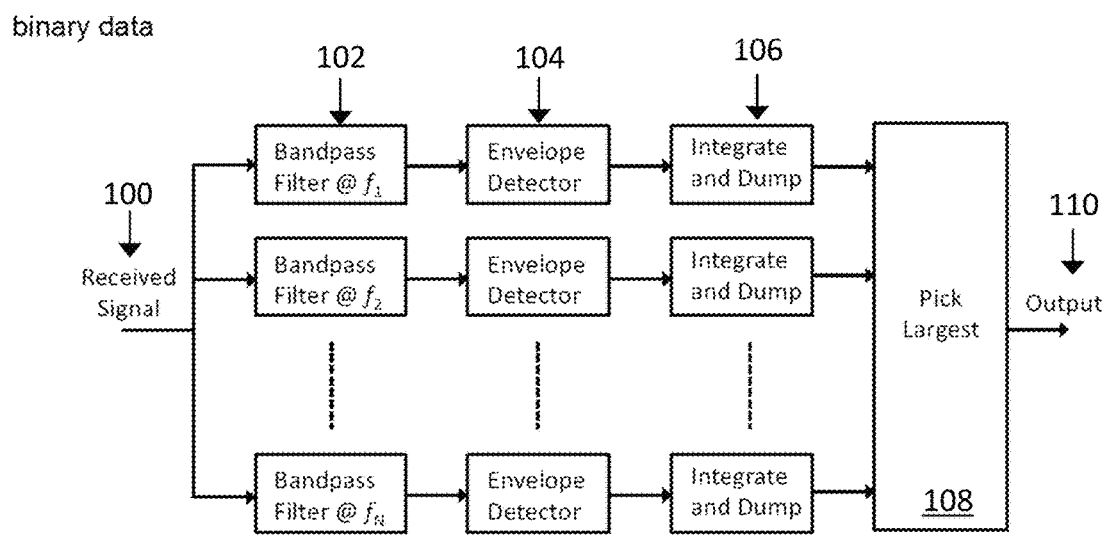
FIG. 10 is a flowchart for a non-coherent receiver for either chirp or direct sequence signals.

FIG. 10 is a block diagram of a preferred receiver 305 for non-coherent signals. In a preferred embodiment electrical signals are received 100 directly or indirectly from a receive transducer 301. See FIG. 1. Each branch of the receiver includes a different bandpass filter 102 that only passes on one of the possible signals (i.e. a signal associated with a particular corresponding $f_i$), followed by an envelope detector function 104 and an integrate-and-dump step 106. An envelope detector 104 is an electronic circuit that takes a high-frequency signal as input and provides an output which is the envelope of the original signal.

The integrate-and-dump step 106 integrates the output of the envelope detector 104 over one symbol interval, passes the resulting integral value on to the next block, clears the integrated value, and proceeds to integrate subsequent envelope detector output over the next symbol interval.

A "symbol" can be described as a pulse (in digital transmission) representing an integer number of bits. A general definition of a symbol is a waveform, a state, or a significant condition of the communication channel that persists for a fixed period of time. In digital communications, a "symbol interval" will be the amount of time (typically a small fraction of a second) each signaling event (i.e. symbol pulse) takes.

One preferred "pick largest" step 108 selects the largest integrator 106 output at the end of each symbol interval and outputs the signal associated with the associated $f_i$ 110.

For chirp signals as described here, $f_i$ corresponds to the lower end of the bandpass filter 102 passband. For the direct sequence signals as described here, $f_i$ corresponds to the center of the passband. In both cases the passband of each filter 102 is sufficiently large to pass signals associated with its $f_i$ but sufficiently small to reject signals associated with the other $f_j$. In some preferred embodiments, there is a frequency gap between neighboring $f_i$ (e.g. between $f_1$ and $f_2$).

In the case of the direct sequence signals, the sidelobes may result in some signal energy spilling into the passband of additional bandpass filters. For example, some energy being detected at the output of the bandpass filter for the signal at $f_2$ when the signal at $f_1$ is sent. This energy will degrade performance slightly.

In alternative embodiments, the envelope detector(s) 104 can be replaced by a demodulating logarithmic amplifier which outputs a signal that is proportional to the logarithm of the envelope. Using a demodulating logarithmic amplifier compresses the dynamic range of the signals and is particularly useful when the input signal may vary over a large range by avoiding the need for an amplifier with an automatic gain control.

In embodiments using on-off keying, where a single signal is used and its presence or absence determines the transmitted bit (e.g. 1 or 0), only a single branch of the receiver is needed. The 'pick largest' block is replaced with a device that detects the presence or absence of the signal.

If multiple signals are transmitted simultaneously (e.g. multiple chirps with different starting frequencies or multiple direct sequence signals with different carrier frequencies), the "pick largest" function 108 is replaced with a device that detects the presence or absence of each signal, and converts that information to the symbol that was sent.

Submerged Channel

Figure 11:
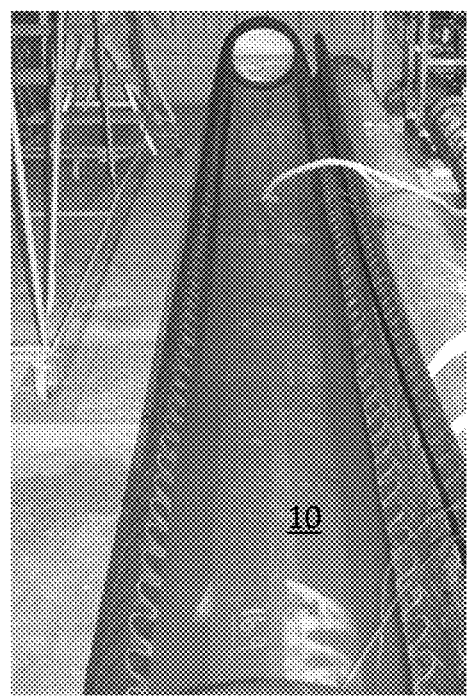
FIG. 11 is a submerged pipe with transducers mounted near its ends which was used for transmission tests.

An alternative test channel for communications was implemented using the same pipe 10 (previously shown in FIG. 5) that was used for the previously described power delivery tests. Wedges with transducers were mounted 17 ft. apart, near the ends of the pipe, and the assembly was submerged in a water tank as shown in FIG. 11 during signal transmission.

Figure 12:
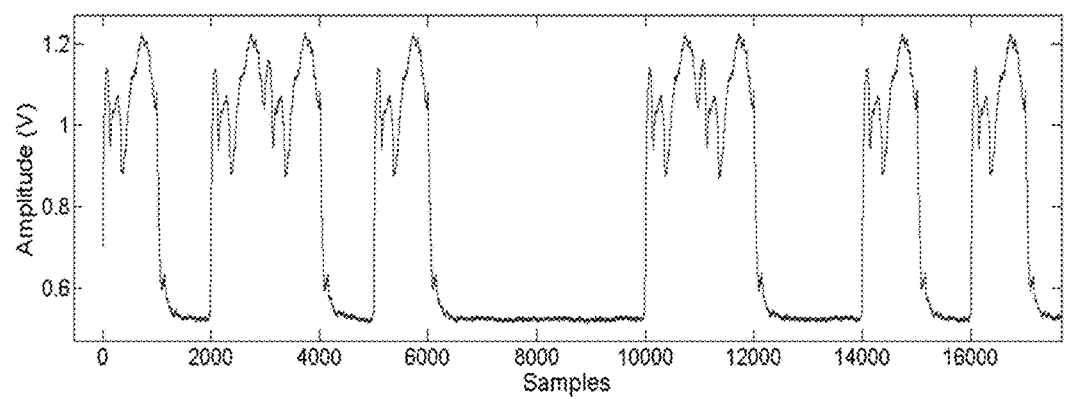
FIG. 12 is a graph of a received chirp waveform using on-off keying, spanning 10 kHz, and centered at 455 kHz. The data sequence transmitted is 101101000011001010, with the '1' bits correspond to the high levels in the plot and the '0' bits to the low levels.

An example of a waveform received in the submerged tests is shown in FIG. 12. In this case, a chirp waveform spanning 10 kHz and centered at 455 kHz was transmitted. The modulation used is Chirp on-off keying at 100 bits/second. The receiver consisted of a ceramic bandpass filter 102 centered at 455 kHz followed by a demodulating logarithmic amplifier (as opposed to an envelope detector 104). The output of the logarithmic amplifier was digitized with a sampling rate of 100 kHz and imported into MATLAB to produce the plot in FIG. 12. The horizontal axis in the plot corresponds to samples, wherein one bit corresponds to 1000 samples. The data sequence transmitted by the waveform was 101101000011001010. The '1' bits correspond to the higher level in the plot. The amplitude variation during these higher intervals is due to the frequency selectivity of the channel, i.e. the received signal level drops as the chirp frequency passes through a region of low channel gain, and increases for regions of high channel gain.

Narrow Pulse Transmission

Figure 13:
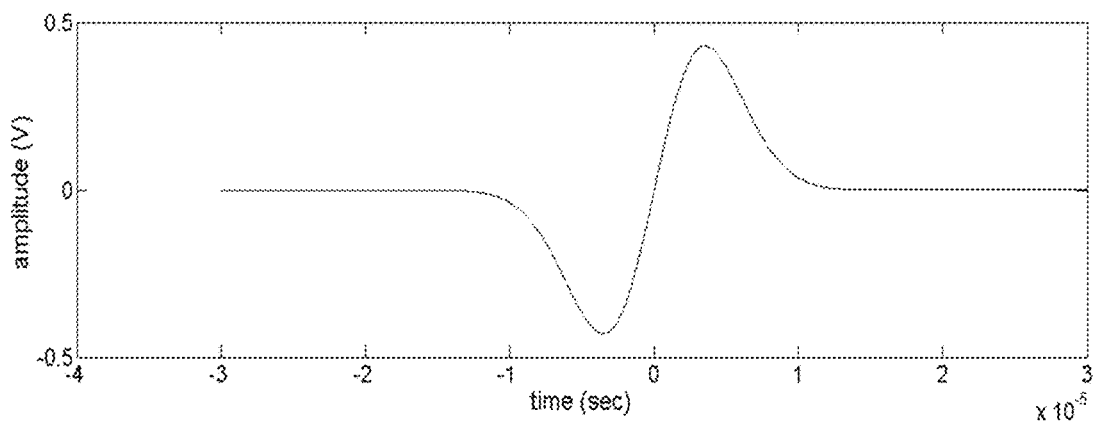
FIG. 13 is a graph of a narrow signal pulse used to communicate over an acoustic-electric channel.
Figure 14:
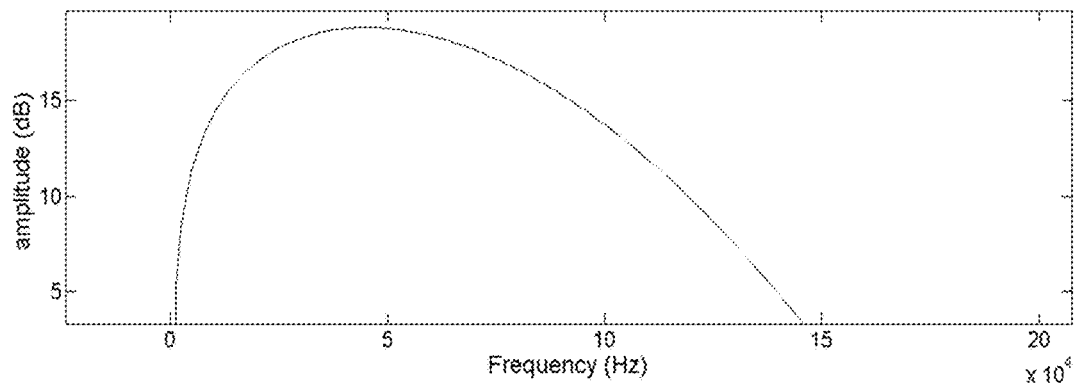
FIG. 14 is a graph of frequency spectrum for the pulse in FIG. 13.
Figure 15:
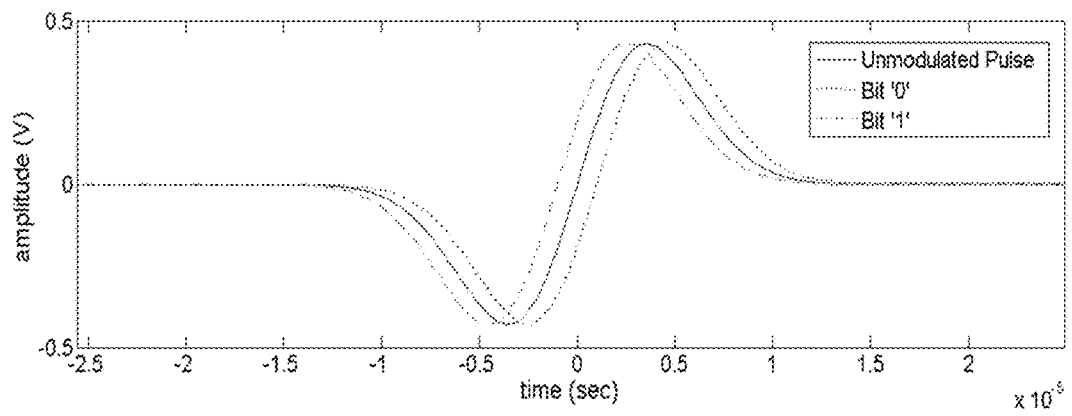
FIG. 15 is a graph illustrating variations of pulse start time to convey binary data.

A signal with a wideband spectrum can also be generated by using narrow pulses having a width that is inversely proportional to the desired bandwidth in the frequency spectrum. The pulses can be Gaussian monocycle (first derivative of a Gaussian pulse) in nature or some other shape. FIG. 13 shows a Gaussian monocycle pulse, and FIG. 14 shows its frequency spectrum. Data can be transferred using the pulses by altering the pulse timing, e.g. encoding the pulse to start before or after a fixed time delay (i.e. slightly early or slightly late) to represent a bit '1' or '0' respectively. FIG. 15 illustrates one preferred type of pulse position modulation. In order to achieve higher data rates, multiple bits can be encoded by utilizing a larger set of possible pulse start times, each corresponding to a particular multi-bit symbol.

These signals can be detected at a receiver non-coherently by observing the time of changes in the received signal strength. Other methods of encoding information into the transmit pulses may also be used. Additionally, multiple pulses may be used to send a single symbol with the receiver combining the energy associated with these pulses, providing improved performance without the need for transmitting pulses with higher energy.

In another approach, consecutive signals are separated by at least the length of the impulse response of the channel. This minimizes the Inter-Symbol-Interference (ISI) occurring due to multipath. Inside one symbol interval, multiple symbols can be encoded using phase and frequency modulation techniques among others to achieve high data rates.

Simultaneous Power and Data Transmission

In some embodiments, power is transmitted in one direction through a channel, and data is transmitted in the opposite direction or in both directions. A preferred approach to managing bi-directional transmission is to implement separate channels for communications and for power delivery. Separate "channels" can be provided by separating transmissions by frequency, by time of transmission, and/or by using separate physical channels.

One method to minimize crosstalk between the communications and power signals is a multiplexing technique in which only one signal (either communication or power) is transmitted at a given time can be used (time-division multiplexing).

Alternately, the signals can be multiplexed by using different frequency ranges for the communications and power signals (frequency-division multiplexing). In this case additional filtering in the communications receiver may be required to suppress the received power signal and prevent the power signal from interfering with the communication transmission.

In some preferred embodiments power and communication signals are conveyed using the same physical channels 10, e.g. the same transducers, pipes/substrates, and wedges, using frequency division multiplexing. Since transfer efficiency is more important for the delivery of power than for communications, in preferred embodiments the power signal is transmitted using a frequency range that is at or near the channel's optimal transfer efficiency. Some embodiments include a step of determining what the optimal transfer frequency is for a given channel, such as by testing and comparing alternative frequencies. The communication signals in such embodiments are sent using a less optimal frequency range than was used for power transmission. In preferred embodiments the communication frequency range is higher than the frequency range used for power delivery to help ensure that ambient noise which might interfere with the communications signal is minimal. The communications signal could also, however, be transmitted using a lower frequency range.

Figure 16:
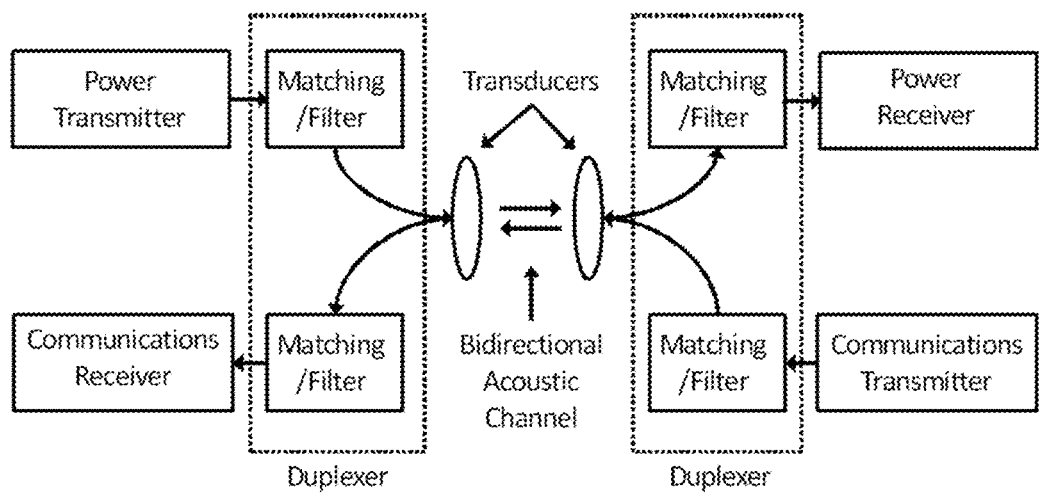
FIG. 16 is flowchart showing a system for sending power in one direction and data in the other direction using transducers through a single physical channel.

FIG. 16 is a block diagram of a preferred system for transmitting both power and communications through a single substrate. In this example power delivery is in one direction and communications is in the other direction, though bi-directional communication is possible if the communications transmitter and receiver are replaced by transceivers. A transceiver is a device comprising both a transmitter and a receiver. Each transmitter and each receiver is coupled to a corresponding transducer using a matching network that matches the impedances for optimal power transfer. Matching networks of reasonable complexity generally match impedances over a small range of frequencies, meaning that they also act as filters. This filtering is desirable to minimize coupling between a transmitter and a receiver that are connected to the same transducer. The combination of filters is often described as a duplexer. Due to the high power differential between the power transmitter and the received communications signal (from the opposite direction) at the same transducer, additional filtering is preferably provided for communication signals received at a side which is also transmitting power. The power receiver preferably includes any required power conversion needed to allow the received power to be utilized, such as rectification and regulation arrangements.

Chirp-OOK Modulation with Non-Coherent Energy Detection

A particularly preferred acoustic-electric channel utilizes chirp on-off keying (Chirp OOK) and non-coherent detection.

A test channel used to test the preferred channel was formed by epoxying curved stainless steel wedges with attached ultrasonic transducers on the exterior of a 5.2 m long steel pipe of 0.25 m diameter and 17.78 mm wall thickness at a separation of 4.8 m (~15 ft.). The wedge guides the acoustic waves generated by the transducer into the steel pipe at an angle of 75° to the surface.

Figures 17A, 17B:
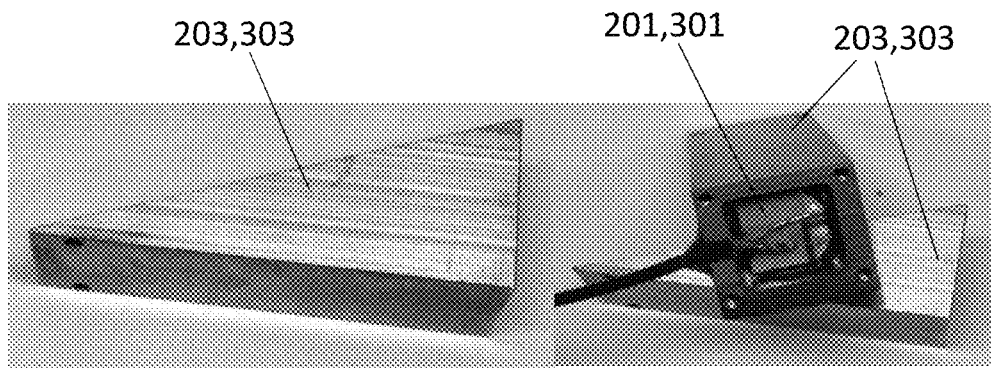
FIGS. 17a and 17b show a 75° steel wedge housing a transducer.
Figure 18:
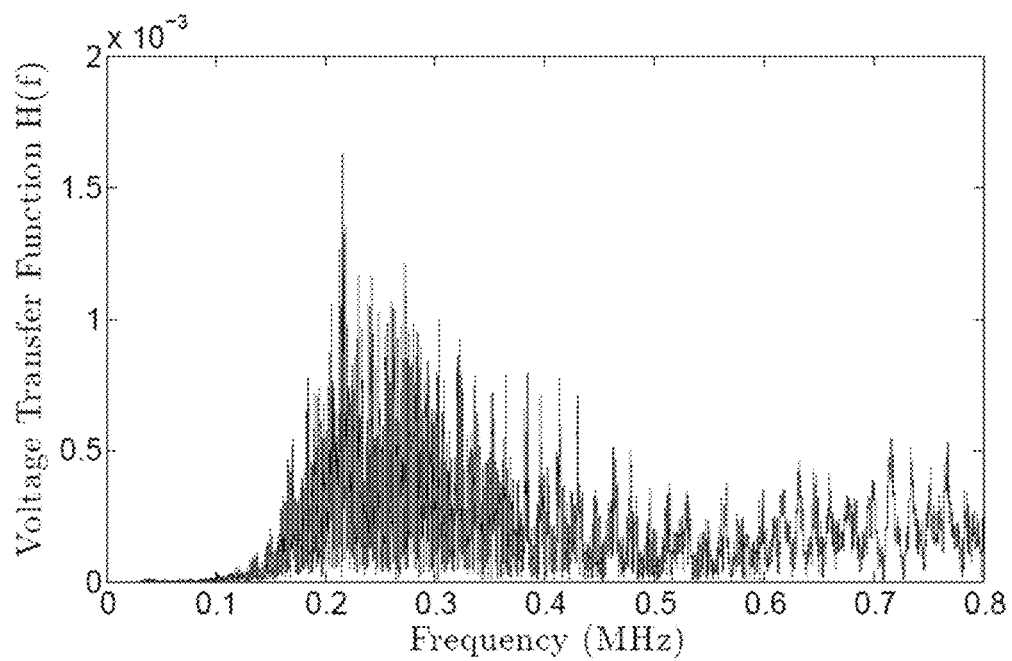
FIG. 18 is a graph of experimental voltage transfer function of a 4.8 m cylindrical pipe in air.
Figure 19:
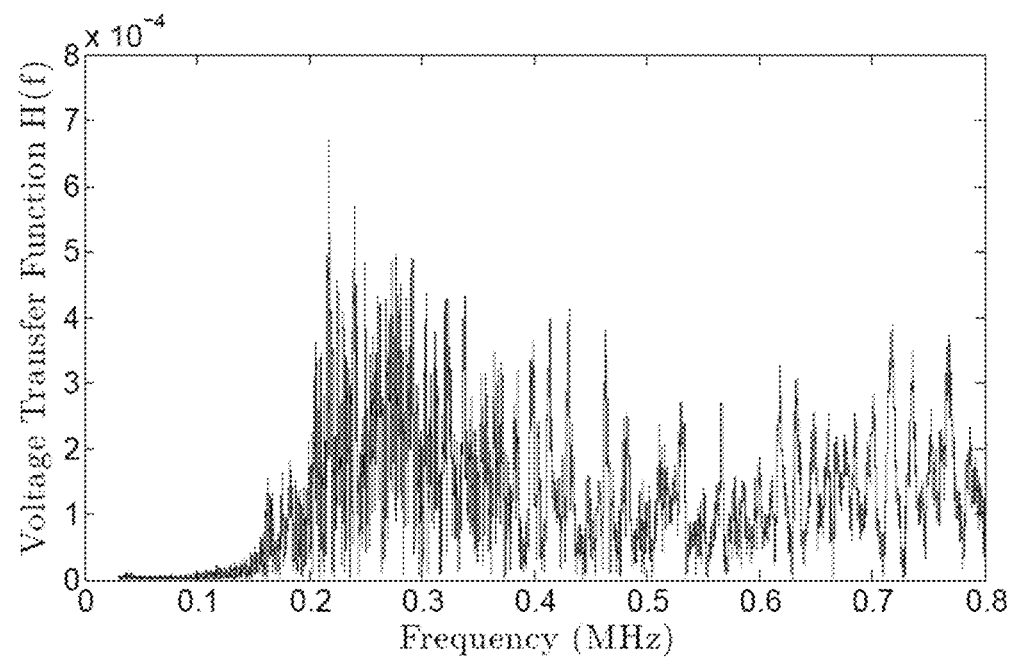
FIG. 19 is a graph of voltage transfer for the same 4.8 m cylindrical pipe arrangement as FIG. 18, but immersed in water.

FIGS. 17a and 17b show a 75° steel wedge housing a transducer. FIG. 18 is a graph of experimental voltage transfer function of a 4.8 m cylindrical pipe in air. FIG. 19 is a graph of voltage transfer for the same 4.8 m cylindrical pipe arrangement immersed in water.

For the submerged channel experiments, the open-ended pipe 10 is placed into a water-filled trough as shown in FIG. 11. The channel response was measured using a vector network analyzer, and it was found that the channel attenuation varies considerably with small changes in frequency. FIGS. 18 and 19 show the voltage transfer function of the cylindrical setup in air vs. when submerged in water. Here, both the source and load impedances are assumed to be 50Ω. The effect of immersion in water on the channel response is evident from the additional attenuation seen in FIG. 19 as compared to FIG. 18. Note that the y-axis scale in FIG. 18 is different from the y-axis scale in FIG. 19.

The effect of this frequency selectivity can be overcome by using wideband modulation schemes according to the present invention. As discussed, wideband signals provide resilience against nulls in the channel response by spreading the signal energy over a large bandwidth.

Further, the conditions under which such acoustic-electric channels could be used pose a challenge when only a limited amount of power is available for communication. This includes both the processing power needed for the operation of the electronics and the transmit power of the modulation scheme. The processing power at the transmit end of the channel is preferably kept to a minimum so that a substantial portion of the total available power is used for actual transmission of data. Hence, it is important to implement simple, low complexity modulation and demodulation techniques.

One particularly preferred solution is a wideband scheme, Chirp-OOK, used with noncoherent energy detection at the receiving end (30, 305) of the channel for sending data across the pipe.

In a preferred Chirp-OOK scheme, simple On-Off signaling is used in conjunction with the chirp signal, i.e. a chirp signal is sent to indicate bit '1' and no signal is sent for a bit '0'. In a chirp signal, the frequency of the carrier is varied linearly over the bit-interval. In one implementation of the present invention, for bit '1', the instantaneous frequency increases over the bit interval. The maximum frequency deviation from the starting frequency is denoted by $f_{\Delta max}$. The value of $f_{\Delta max}$ quantifies the amount of spreading of the signal energy and is preferably greater than the coherence bandwidth (CB) of the channel to be effective against the frequency selectivity. The coherence bandwidth represents the frequency expanse over which the channel experiences similar fading and can be calculated from the auto-correlation of the channel transfer function. The coherence bandwidth of the exemplary channel immersed in water was found to be 400 Hz. Selecting $f_{\Delta max}$ greater than the coherence bandwidth CB ensures that even if the channel characteristic becomes highly attenuated for some segment(s) of the chirp bandwidth, there will still be enough signal strength at the receiver 30 at other portions of the chirp bandwidth.

In this exemplary embodiment, we have selected $f_{\Delta max}$ to be 10 kHz.

Mathematically, the chirp signal is represented as:

$$s_{chirp}(t) = A \cos [2\pi f(t)t], \ 0 < t \leq T$$

where T is the bit period and the instantaneous frequency, and $f_i(t)$, is given by:

$$f_i(t) = f_c + f_{\Delta max} \frac{t}{T}$$

where $f_c$ is the starting frequency of the chirp signal.

The transmission bandwidth, $B_T$, of the chirp signal can be approximated using Carson's rule as $$B_T = 2f_{\Delta max} + 2R,$$

where R is the communication data rate.

Figure 20:
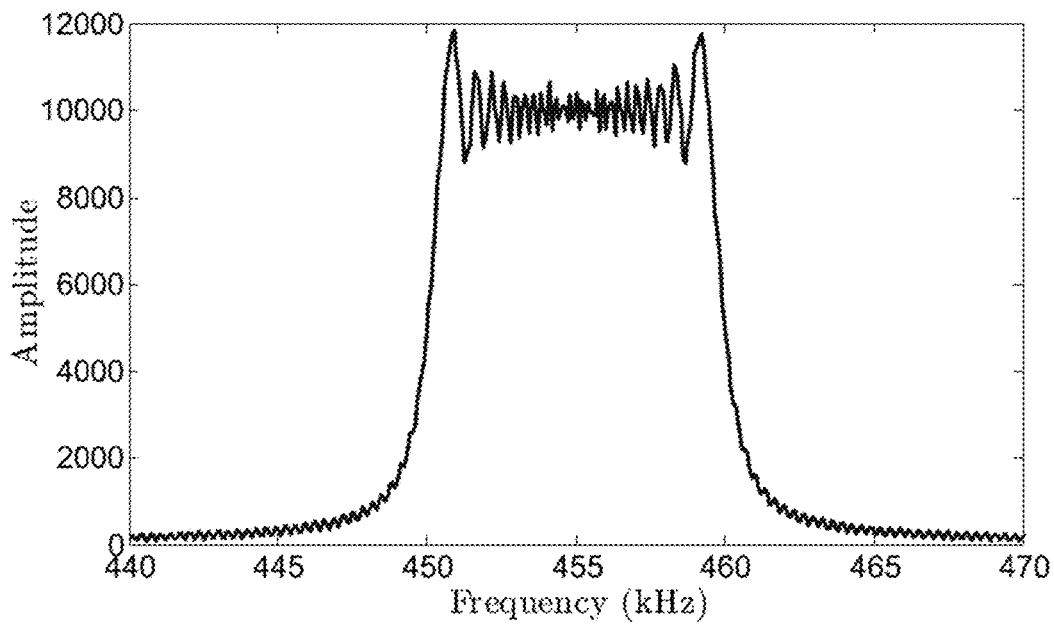
FIG. 20 is a Fast Fourier Transform of a Chirp signal with $f_{\Delta max}$=10 kHz.

FIG. 20 shows the FFT (Fast Fourier Transform) of a chirp signal obtained by sending bit '1' with 450 kHz as the starting frequency, $f_c$. It is observed from the figure that there is a distribution of the signal power corresponding to its wide-band nature from 450 kHz to 460 kHz. The chirp signal in FIG. 20 therefore has an $f_{\Delta max}$=10 kHz.

Demodulation of Chirp-OOK Signals

The concentration of signal power corresponding to bit '1' in a distinct frequency range is exploited to implement a non-coherent energy detection demodulator.

Figure 21:
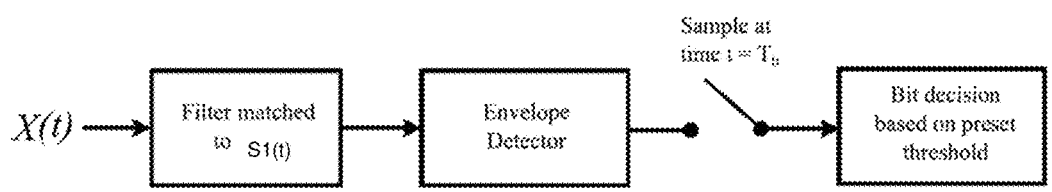
FIG. 21 is a block diagram for detecting a Chirp-OOK signal.

FIG. 21 is a block diagram for energy detection of chirp-OOK signal.

Figure 22:
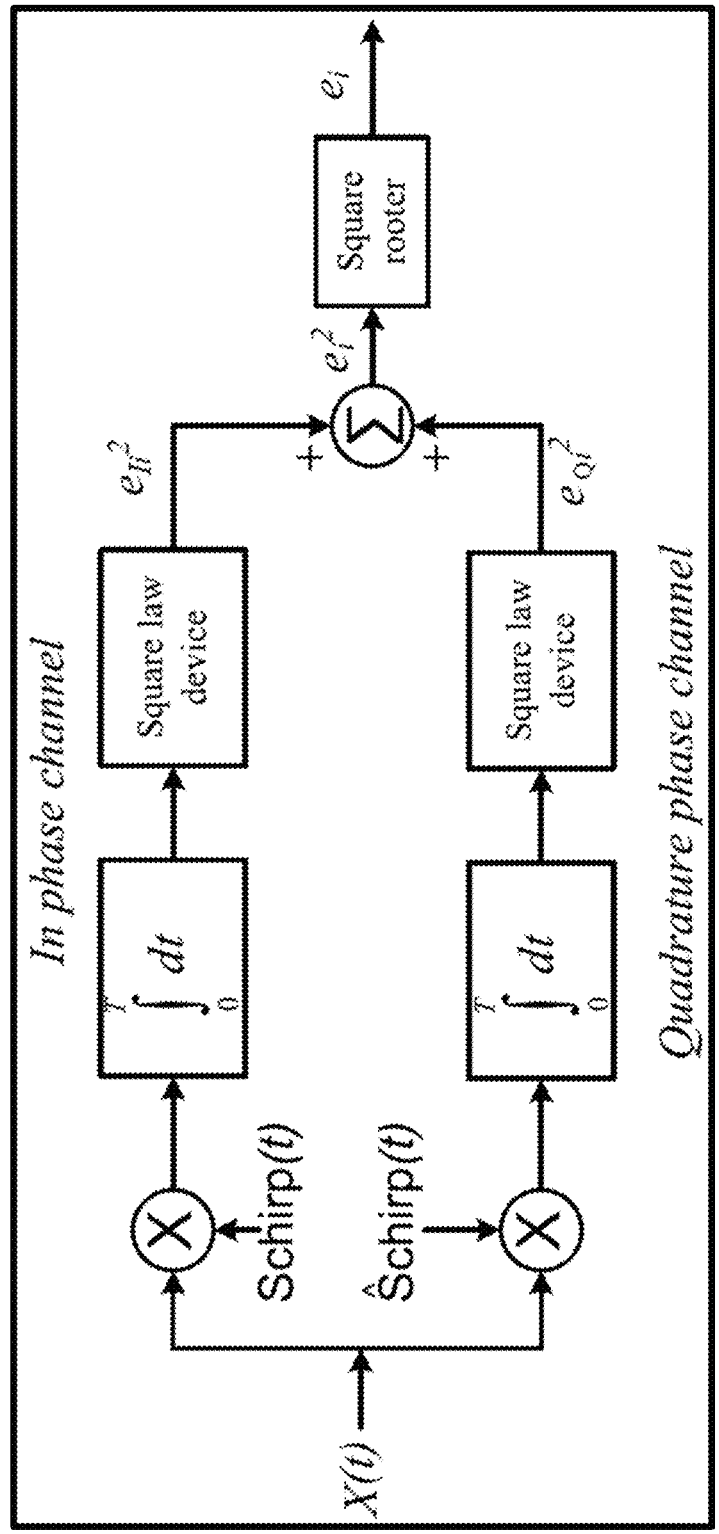
FIG. 22 is a block diagram for Quadrature implementation of a matched filter and envelope detection.

FIG. 22 is a block diagram for quadrature implementation of a matched filter and envelope detector. Wave oscillations are said to be in quadrature if they are separated in phase by 90°.

A matched filter is used to recover the chirp corresponding to bit '1' and then envelope detection is used to make the bit decision. In signal processing, a matched filter is obtained by correlating a known signal, or template, with an unknown signal to detect the presence of the template in the unknown signal. The matched filter corresponding to a chirp input is also a chirp, but in the reverse direction. FIG. 21 shows a preferred block diagram of this energy detection technique. $S_1(t)$ is the local copy of the signal corresponding to bit '1', i.e., $s_{chirp}(t)$. The matched filter-envelope detection is further preferably implemented as a pair of quadrature correlators followed by a non-coherent combiner as shown in FIG. 22. The correlators integrate the products of the input signal and local copies of the signals over the bit period, T. The result is the same as taking the optimal sample at the matched-filter output. $s_{chirp}(t)$ and $\hat{s}_{chirp}(t)$ are the local copies of the signals where $\hat{s}_{chirp}(t)$ is the Hilbert transform of $s_{chirp}(t)$:

$$\hat{s}_{chirp}(t) = A \sin [2\pi f(t)t], \ 0 < t = T.$$

The signals at the output of the correlators for the branch corresponding to bit '1' is denoted by $e_{I1}$ (in-phase) and $e_{Q1}$ (quadrature). The output of the in-phase and quadrature phase correlators are squared, added, and the square root is taken. When bit '0' is sent, noise is input to the receiver, while when bit '1' is sent, chirp signal corrupted with additive noise is the input. For AWGN (Additive White Gaussian Noise), the envelope of the noise signal when passed through a matched filter follows a Rayleigh distribution while the envelope of signal plus noise component follows a Rician distribution. The optimal decision threshold is dependent on the Signal to Noise Ratio (SNR) of the channel and setting the optimal threshold is non-trivial. The optimal threshold can be theoretically found from the intersection of the Rician and Rayleigh distributions for the given SNR corresponding to bit '1' and bit '0' respectively. One way that this threshold can be found is by sending a long random binary stream of data and then processing the received signal to compute the probability distribution functions of the envelope. However, this is not practical as the method is very power intensive. Since the channel characteristics under investigation are quasi-static in nature and we are going to operate in regions of high $E_b/N_0$ (bit energy to noise power spectral density ratio), one way to compute the threshold sub-optimally is by sending a known bit stream of small length before the actual transmission of data and determining the noise floor at that time. The threshold can be set halfway between the noise level and the signal plus noise level.

The theoretical performance bound for this demodulation technique assuming optimal threshold for large values of $E_b/N_0$ is $$P_{error} = \frac{1}{2} \exp\left(-\frac{E_b}{2N_0}\right).$$

This expression is the same as that for non-coherent detection of binary FSK in AWGN. However it must be noted that, when a chirp is passed through a frequency selective channel, the matched filter impulse responses are based on the convolution of the chirp signal with the channel impulse response. Consequently the channel must be known a-priori.

In order to avoid the dependence on channel properties and the need to adapt to changes in the channel, a standard band pass filter can be used as a sub-optimal alternative to the matched filter. The 3-dB bandwidth of the filter should be at least equal to the frequency deviation of chirp (i.e. $f_{\Delta max}$) so that most of the chirp signal energy is captured. The performance of this energy detection scheme using practical band pass filters does not vary with the channel being used because $E_b/N_0$ is measured at the input to the receiver and as long as the average energy per bit coming out of the channel is same as that for a non-frequency-selective channel (flat channel), error rates will be similar. However, more power needs to be sent to maintain the same received $E_b/N_0$ for channels with higher attenuation. The probability of error for a Chirp-OOK scheme using energy detection for a multipath channel that is modeled as a tapped delay line filter is given by the following expression:

$$P_{error,OOK} \approx Q\left(\frac{(2E_{cap}(T_0, T_1)/N_0)}{\sqrt{BT_1} + \sqrt{BT_1 + 4E_{cap}(T_0, T_1)/N_o}}\right)$$

where, $E_{cap}(T_0, T_1)$ is the captured energy in the integration interval between $T_0$ and $T_1$, e.g. over the bit interval, and B is the noise equivalent bandwidth of the band pass filter on the receiver front end.

Monte Carlo Simulations of Chirp-OOK Channel

Monte-Carlo simulations of the communication channel were performed using the MATLAB® language and interactive environment. Monte Carlo simulations are a class of computational algorithms that rely on repeated random sampling to obtain numerical results.

Figure 24:
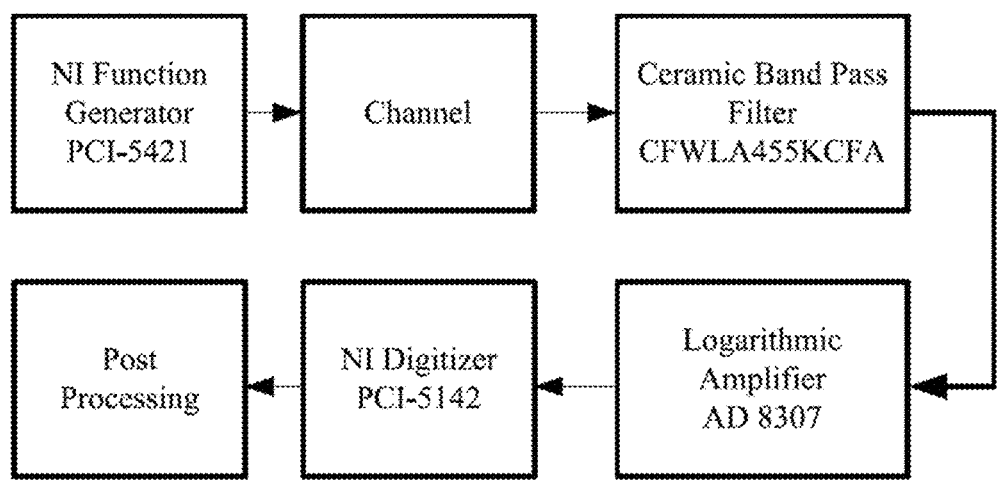
FIG. 24 is a block diagram of preferred hardware.

A complex signal representation was used where a signal is represented as I(t)+j Q(t), where I(t) and Q(t) are the In-phase and Quadrature phase components, respectively. The signal from the transmitter was convolved with the impulse response of the channel, and the output was fed to a receiver. The impulse response was calculated by taking the IFFT (Inverse Fast Fourier Transformation) of the experimentally measured transfer function of the channel. The matched filter energy detection was implemented by using a pair of quadrature filters matched to the chirp—i.e., the filters do not include the channel response. A third order Butterworth band pass filter with pass band from 445 kHz to 465 kHz was used to simulate a practical filter. The Butterworth filter is a type of signal processing filter designed to have as flat a frequency response as possible in the passband. It is also referred to as a maximally flat magnitude filter. The envelope detection was implemented by taking the logarithm of the absolute value of the signal. The logarithm is taken to mimic the behavior of the logarithmic amplifier which is used in actual hardware as shown in FIG. 24. The threshold was set by sending a random binary stream of 5000 bits before the actual transmission and taking the average of the received values.

Figure 23:
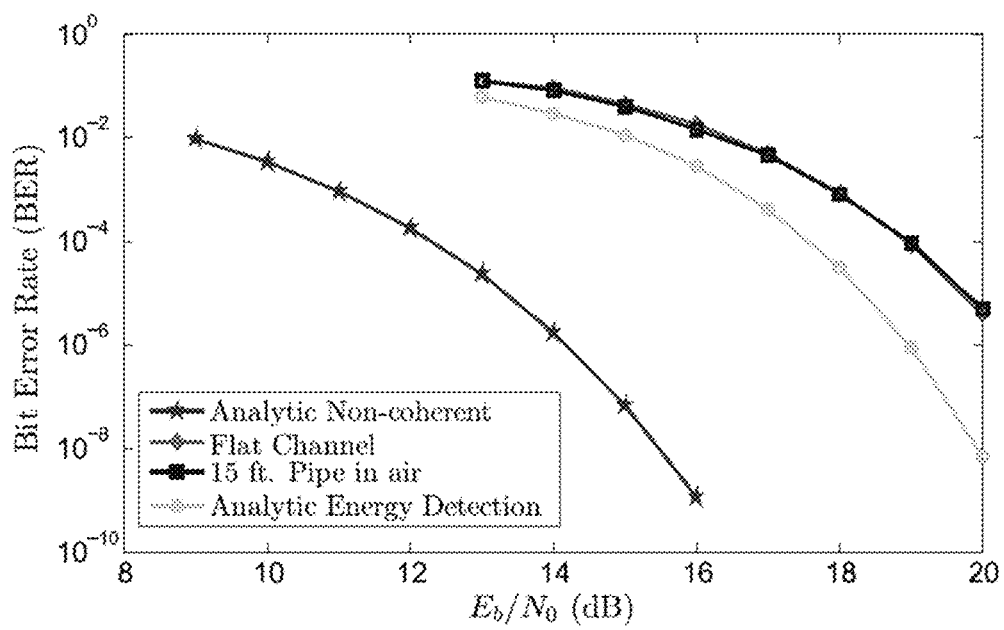
FIG. 23 is a graph of bit error rate performance of a Chirp-OOK arrangement.

FIG. 23 shows the BER (Bit Error Rate) performance of Chirp-OOK scheme when used for transmitting data through a flat (non-frequency-selective) channel, and through a 4.8 m cylindrical pipe in air. The performance of the Chirp-OOK scheme using a practical band pass filter is observed to be the same for a flat channel and for the frequency selective channel. However, there is an 8 dB loss in the performance from the theoretical non-coherent result (star marker) due to the use of a practical band pass filter. The analytical expression for energy detection as obtained using the equation (circle marker):

$$P_{error,OOK} \approx Q\left(\frac{(2E_{cap}(T_0, T_1)/N_0)}{\sqrt{BT_1} + \sqrt{BT_1 + 4E_{cap}(T_0, T_1)/N_o}}\right),$$

follows the Monte-Carlo simulations (square and diamond markers) very closely, with less than 2 dB mismatch between the two plots.

A preferred low power simple modulation scheme, Chirp-OOK, has been developed for transmission of data at low rates across the length of a pipe or other substrate using ultrasound. The performance of the Chirp-OOK modulation scheme obtained using Monte-Carlo simulations with the measured channel response has been found to be very close to the theoretical limits as predicted for the multipath channel. The performance of the scheme is found to be independent of the type of the channel as long as the received $E_b/N_0$ is kept constant. Hardware implementation may be achieved using programmable boards to demonstrate the feasibility of the scheme.

Exemplary Hardware

An exemplary, non-limiting embodiment of the invention was achieved as follows. Persons of skill in the art will appreciate that the systems and methods disclosed herein can be implemented with a variety of hardware components.

Figure 25:
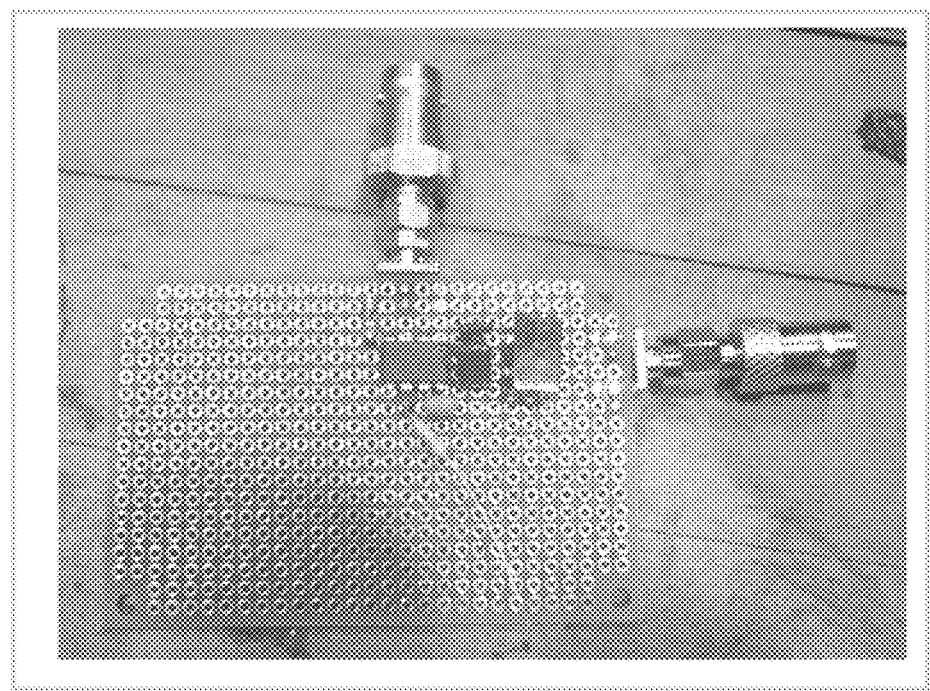
FIG. 25 is a non-coherent energy detection board including a ceramic band pass filter and logarithmic amplifier.

A data transmission link was implemented for the channels using generally available hardware components, including programmable signal generators and digitizers as shown in FIG. 24. The transmitter was implemented using an arbitrary waveform generator, in this case the PCI-5421 board from National Instruments®. The transmitted signal from the PCI-5421 is applied to the transmit transducer 201, passes through the channel 10, and is demodulated using dedicated hardware 30,305. The demodulator circuitry is composed of a ceramic filter (CFWLA455KCFA-B0 from Murata® Manufacturing Co.), coupling capacitors, and a logarithmic amplifier (AD8307 from Analog Devices®). The ceramic filter is a band pass filter centered at 455 kHz with a 6 dB bandwidth of 25 kHz (greater than $f_{\Delta max}$). The log amp (logarithmic amplifier) takes the log of the envelope of the band pass filtered data. One of the advantages of using a logarithmic amplifier is that it compresses the dynamic range, making it possible to operate over a wide range of received signal level. The narrow dynamic range stabilizes the bit decision threshold associated with the OOK scheme making it less dependent on the received signal level. FIG. 25 shows the circuit board for the energy detection technique. The demodulated signal is acquired using a 14-bit digitizer, PCI-5142 board from National Instruments®, for further processing.

Transmit and receive assemblies can each be on the inside or outside of a pipe/substrate, and may or may not be on the same side of the substrate.

Figure 26:
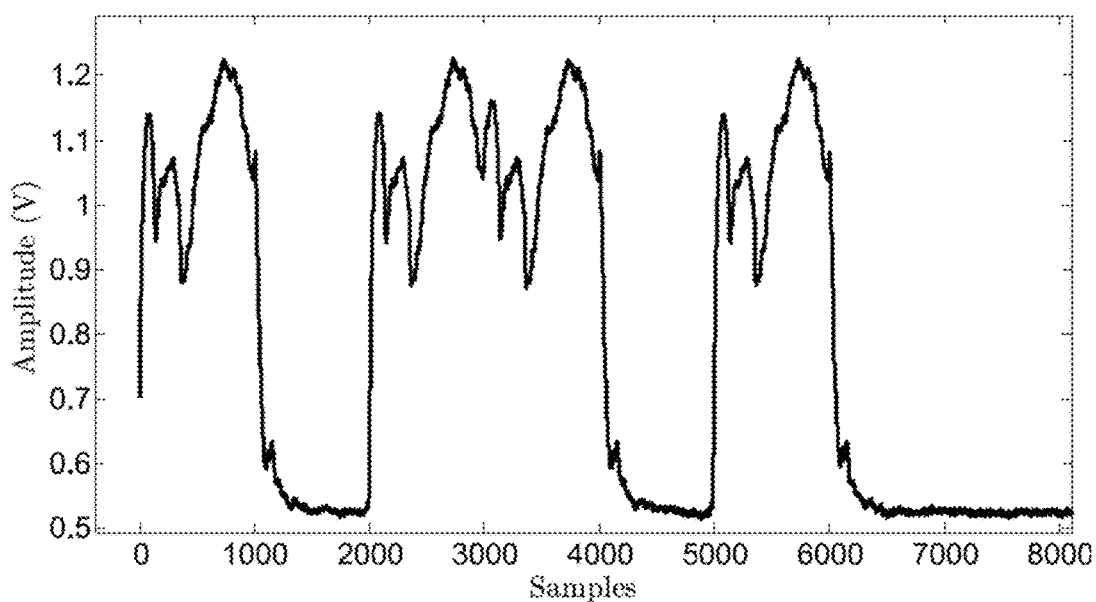
FIG. 26 is a graph of a series of demodulated chirp signals indicating a series of '1' and '0' values.

FIG. 26 shows the demodulated signal as captured by the PCI-5142. The channel response can be seen in the samples corresponding to bit '1', for e.g. samples 1 to 1000 while the flat response in samples 1000 to 2000 etc. corresponds to bit '0'. The data sequence for the waveform shown is '10110100'. The post processing step is performed in MATLAB and includes integrating over a data bit and thresholding to make bit decisions. Successful data transmission is achieved across the 4.8 m long pipe of diameter 0.25 m and 17.78 mm thickness both when in air and when submerged in water, at the rate of 100 bps using less than 10 mW of transmit power.

In the claims, the term "pipe" should be understood to include other roughly cylindrical, elongated conduits generally, such as casings or other rigid tubes.

CONCLUSION

This invention is conceived of as including both arrangements and methods for transmitting power and data through acoustic-electric channels, such as metal channels which are flat and/or which include casings or pipes. This invention includes underground drilling and piping arrangements, such as for fossil fuel extraction, and methods of transmitting power and energy in those arrangements. The invention includes Chirp-OOK arrangements, other chirp arrangements, direct sequence signal arrangements, other wideband modulation transmission systems, and methods using such arrangements to transmit power and/or signals, simultaneously or alternatingly. The invention includes transmitter and receiver arrangements both separately and as part of a single assembly. The invention includes non-coherent receiver arrangements, demodulation arrangements, rectifier arrangements, and methods comprising the same. The invention includes a method of selecting signals for use with acoustic-electric channels based on the coherence bandwidth of the channel.

While a specific embodiment of the invention has been shown and described in detail to illustrate the application of the principles of the invention, it will be understood that the invention may be embodied otherwise without departing from such principles. It will also be understood that the present invention includes any reasonable combination or sub-combination of the features and elements disclosed herein and any combination of equivalent features. The exemplary embodiment shown herein are presented for the purposes of illustration only and are not meant to limit the scope of the invention. Thus, all the features of all the embodiments disclosed herein are interchangeable so that any element of any embodiment may be applied to any of the embodiments taught herein.

What is claimed is:

1. A method of transmitting binary data axially along a length of metal pipe, the method comprising:
    providing an acoustic-electric channel, the acoustic-electric channel comprising:
        a metal pipe, the pipe being a substrate;
        a first assembly coupled to the pipe, and a second assembly coupled to the pipe and axially spaced apart from the first assembly;
        wherein the first assembly comprises: a first transition piece coupled to the pipe, a first transducer coupled to the first transition piece, and first electronics communicatively linked to the first transducer;
        wherein the second assembly comprises: a second transition piece coupled to the pipe, a second transducer coupled to the second transition piece, and second electronics communicatively linked to the second transducer;
        wherein the acoustic-electric channel has a coherence bandwidth (CB);
    the method further comprising:
    the first transducer generating wideband shear-horizontal waves, the shear-horizontal waves being modulated to form a series of Chirp signals comprising binary data, wherein each Chirp signal has a varied frequency over the course of the Chirp signal, each Chirp signal has an initial frequency $f_i$, and each Chirp signal has a value $f_{\Delta max}$ which is a maximum frequency deviation from the starting frequency $f_i$;
    wherein $f_{\Delta max}$ is greater than the coherence bandwidth (CB) of the acoustic-electric channel;
    said shear horizontal waves generated by the first transducer propagating through the first transition piece, into the pipe, thence into the second transition piece and the second transducer;
    the second transducer turning received shear horizontal wave energy into received electrical energy; and
    demodulating the received electrical energy as binary data, wherein the presence and absence of Chirp signals over time are interpreted as binary data by the second electronics.

2. The method of transmitting binary data axially along a length of metal pipe of claim 1, wherein at least one of the first transition piece and the second transition piece comprises a metallic triangular wedge coupled to the pipe.

3. The method of transmitting binary data axially along a length of metal pipe of claim 1,
    the method further comprising transmitting power for operating one or more electronic devices through the acoustic-electric channel;
    wherein the second electronics comprise a DC rectification circuit;
    wherein the received electrical energy is AC electrical energy;
    wherein the received electrical energy is converted from AC electrical energy to DC electrical energy by the DC rectification circuit;
    the method comprising the step of using the DC electrical energy to operate at least one of a sensing device and data transmitting device.

4. The method of transmitting binary data axially along a length of metal pipe of claim 1,
    wherein the acoustic-electric channel comprises a plurality of second assemblies coupled to the pipe, each comprising a second transducer, and all of which are axially spaced apart along the pipe from one or more first assemblies;
    wherein the second electronics comprise a multi-element rectification circuit.

5. The method of transmitting binary data axially along a length of metal pipe of claim 1,
    wherein the acoustic-electric channel comprises a plurality of second assemblies coupled to the pipe, each comprising a second transducer, and all of which are axially spaced apart along the pipe from one or more first assemblies;
    wherein the second electronics comprise a multi-element rectification circuit; and
    wherein a circuit between the second transducers and the multi-element rectification circuit comprises a voltage transformer.

6. The method of transmitting binary data axially along a length of metal pipe of claim 1,
    wherein the first transducer sends a plurality of Chirp signals at the same time, wherein frequency ranges of said Chirp signals sent at the same time substantially do not overlap; and
    wherein said plurality of Chirp signals are interpreted as data by the second electronics.

7. The method of transmitting binary data axially along a length of metal pipe of claim 1, wherein the received electrical energy is demodulated using non-coherent reception.

8. The method of transmitting binary data axially along a length of metal pipe of claim 1,
wherein the received electrical energy is received non-coherently by a process comprising the steps of:
receiving electrical signals from one or more second transducers;
passing said electrical signals into one or more band pass filters, with the filter discarding electrical signals outside a filter wavelength window, and passing on electrical signals which are within a filter wavelength window;
for electrical signals passed on from said one or more band pass filters, passing the electrical signals through an envelope detector circuit, with the envelope detector circuit outputting a signal envelope of signals it receives; and
passing said signal envelopes on to an integrate-and-dump circuit which integrates signal envelope over a symbol interval into a symbol value, and passing on the symbol value.

9. The method of transmitting binary data axially along a length of metal pipe according to claim 1 using on-off keying,
wherein the received electrical energy is received non-coherently using a receiver by a process comprising the steps of:
receiving electrical signals from one or more second transducers;
passing said electrical signals into a band pass filter, with the filter discarding electrical signals outside a filter wavelength window, and passing on electrical signals which are within a filter wavelength window;
for electrical signals passed on from said one or more band pass filters, passing the electrical signals through an envelope detector circuit, with the envelope detector circuit outputting a signal envelope of signals it receives;
passing said signal envelopes on to an integrate-and-dump circuit which integrates signal envelope over a symbol interval into a symbol value, and passing on the symbol value; and
detecting the presence or absence of a series of signal values over time, and interpreting the presence or absence of signals as one of a '1' and a '0'.

10. The method of transmitting binary data axially along a length of metal pipe of claim 1,
wherein the received electrical energy is received non-coherently using a receiver by a process comprising the steps of:
receiving electrical signals from one or more second transducers;
passing said electrical signals into one or more matched filters, with the matched filter discarding electrical signals outside a filter wavelength window, and passing on electrical signals which are within a filter wavelength window;
for electrical signals passed on from said one or more band pass filters, passing the electrical signals through an envelope detector circuit, with the envelope detector circuit outputting a signal envelope of signals it receives; and
passing said signal envelopes on to an integrate-and-dump circuit which integrates signal envelope over a symbol interval into a symbol value, and passing on the symbol value.

11. The method of transmitting binary data axially along a length of metal pipe according to claim 1 using on-off keying,
wherein only a single stream of Chirps is transmitted from the first transducer to the second transducer, the stream of Chirps being transmitted intermittently, and wherein the presence and absence of Chirp signals over time is interpreted as a string of '1' and '0' values.

12. A method of transmitting data along a substrate, the method comprising:
providing an acoustic-electric channel, the acoustic-electric channel comprising:
a solid substrate;
a first assembly coupled to the substrate, and a second assembly coupled to the substrate spaced apart from the first assembly;
wherein the first assembly comprises: a first transition piece coupled to the pipe, a first transducer coupled to the first transition piece, and first electronics communicatively linked to the first transducer;
wherein the second assembly comprises: a second transition piece coupled to the pipe, a second transducer coupled to the second transition piece, and second electronics communicatively linked to the second transducer;
wherein the acoustic-electric channel has a coherence bandwidth (CB);
the method further comprising:
the first transducer generating wideband shear-horizontal waves, the shear-horizontal waves being modulated to form a series of wideband signals comprising data, wherein each wideband signal has a maximum frequency and a minimum frequency, and the difference between the maximum frequency and minimum frequency is $f_A$;
wherein $f_A$ is greater than the coherence bandwidth (CB) of the acoustic-electric channel;
said shear horizontal waves generated by the first transducer propagating through the first transition piece, into the substrate, thence into the second transition piece and the second transducer;
the second transducer turning received shear horizontal wave energy into received electrical energy; and
demodulating the received electrical energy as data.

13. The method of transmitting data along a substrate of claim 12, wherein the substrate comprises a metal pipe.

14. The method of transmitting data along a substrate of claim 12, wherein at least one of the first transition piece and the second transition piece are wedge shaped.

15. The method of transmitting data along a substrate of claim 12,
wherein the shear-horizontal waves are modulated as Chirp signals, and wherein each Chirp signal varies its frequency over the course of the Chirp signal.

16. The method of transmitting data along a substrate of claim 12,
wherein the shear-horizontal waves are modulated as direct-sequence spread signals.

17. The method of transmitting data along a substrate of claim 12,
wherein the received electrical energy is received non-coherently using a receiver by a process comprising the steps of:
receiving electrical signals from one or more second transducers;
passing said electrical signals into one or more band pass filters, with each filter discarding electrical signals outside a filter wavelength window corresponding to that filter, and passing on electrical signals which are within the filter wavelength window corresponding to that filter;

for electrical signals passed on from said one or more band pass filters, passing the electrical signals through one or more envelope detector circuits, with the envelope detector circuits outputting a signal envelope of signals they receive; and passing said signal envelopes on to one or more integrate-and-dump circuits which each integrate signal envelope over a symbol interval as a symbol value, and passing on the symbol value.

18. The method of transmitting data along a substrate of claim 17,
wherein the receiver comprises a plurality of branches, with each branch including a band pass filter, an envelope detector circuit, and an integrate-and-dump function.

19. The method of transmitting data along a substrate of claim 12,
wherein the data comprises binary data;
wherein the shear-horizontal waves are modulated as Chirp signals, wherein each Chirp signal had a varying frequency over the course of the Chirp signal; and
wherein the data is transmitted by on-off keying.

20. The method of transmitting data along a substrate of claim 12,
wherein the acoustic-electric channel comprises a plurality of second assemblies coupled to the substrate, each comprising a second transducer, and all of which are axially spaced apart on the substrate from one or more first assemblies;
wherein the second electronics comprise a multi-element rectification circuit.

21. The method of transmitting data along a substrate of claim 12,
wherein the data is transmitted using orthogonal frequency division multiplexing (OFDM), and wherein transmission using OFDM comprises the first transducer generating a plurality of signals on a plurality of subcarriers.

* * * * *